(12) United States Patent
Yu et al.

(10) Patent No.: US 12,316,747 B2
(45) Date of Patent: May 27, 2025

(54) KEY MANAGEMENT DEVICE, QUANTUM CRYPTOGRAPHY COMMUNICATION SYSTEM, AND PROGRAM

(71) Applicant: KABUSHIKI KAISHA TOSHIBA, Tokyo (JP)

(72) Inventors: Yu Yu, Kawasaki Kanagawa (JP); Yoshimichi Tanizawa, Yokohama Kanagawa (JP); Ririka Takahashi, Setagaya Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 195 days.

(21) Appl. No.: 17/821,545

(22) Filed: Aug. 23, 2022

(65) Prior Publication Data

US 2023/0299941 A1    Sep. 21, 2023

(30) Foreign Application Priority Data

Mar. 17, 2022  (JP) ................. 2022-042882

(51) Int. Cl.
 *H04L 9/08*   (2006.01)
(52) U.S. Cl.
 CPC .......... *H04L 9/0819* (2013.01); *H04L 9/0852* (2013.01)
(58) Field of Classification Search
 CPC ............................ H04L 9/0819; H04L 9/0852
 See application file for complete search history.

(56) References Cited

U.S. PATENT DOCUMENTS

2013/0251154 A1   9/2013   Tanizawa et al.
2014/0365786 A1   12/2014   Tanizawa et al.
(Continued)

FOREIGN PATENT DOCUMENTS

EP   3541007 A1 *   9/2019   .......... H04L 9/0656
JP   2014-241463 A   12/2014
(Continued)

OTHER PUBLICATIONS

International Telecommunication Union, Telecommunication Standardization Sector (ITU-T), "Series Y: Global Information Infrastructure, Internet Protocol Aspects, Next-Generation Networks, Internet of Things and Smart Cities Cloud Computing: Overview on networks supporting quantum-key distribution," Recommendation ITU-T Y.3800, 22 pages (2019).
(Continued)

*Primary Examiner* — Nelson S. Giddins
(74) *Attorney, Agent, or Firm* — Finnegan, Henderson, Farabow, Garrett & Dunner, LLP

(57) ABSTRACT

A key management device according to an embodiment is for managing an application key used for encrypting communication of a user network including cryptographic applications. The key management device includes a plan acquisition unit, a plan execution unit, a communication unit, and a provision unit. The plan acquisition unit acquires a key distribution plan formulated based on state information indicating a state of the user network. The plan execution unit determines a distribution amount of the application key for each key sharing destination corresponding to a destination cryptographic application based on the key distribution plan. The communication unit encrypts the application key using a link key generated by QKD, and transmits the encrypted application key to the key sharing destination. The provision unit provides the application key in response to a request from the cryptographic application.

10 Claims, 16 Drawing Sheets

(56) References Cited

U.S. PATENT DOCUMENTS

2016/0269177 A1* 9/2016 Tanizawa .............. H04L 9/0858
2021/0328784 A1* 10/2021 Doi .................... G06Q 30/0283

FOREIGN PATENT DOCUMENTS

| JP | 5634427 B2 | 12/2014 |
| JP | 2016-171530 A | 9/2016 |
| JP | 2019-161557 A | 9/2019 |

OTHER PUBLICATIONS

Japan Patent Office, Office Action in JP App. No. 2022-042882, 2 pages, and machine translation, 3 pages (Oct. 29, 2024).

* cited by examiner

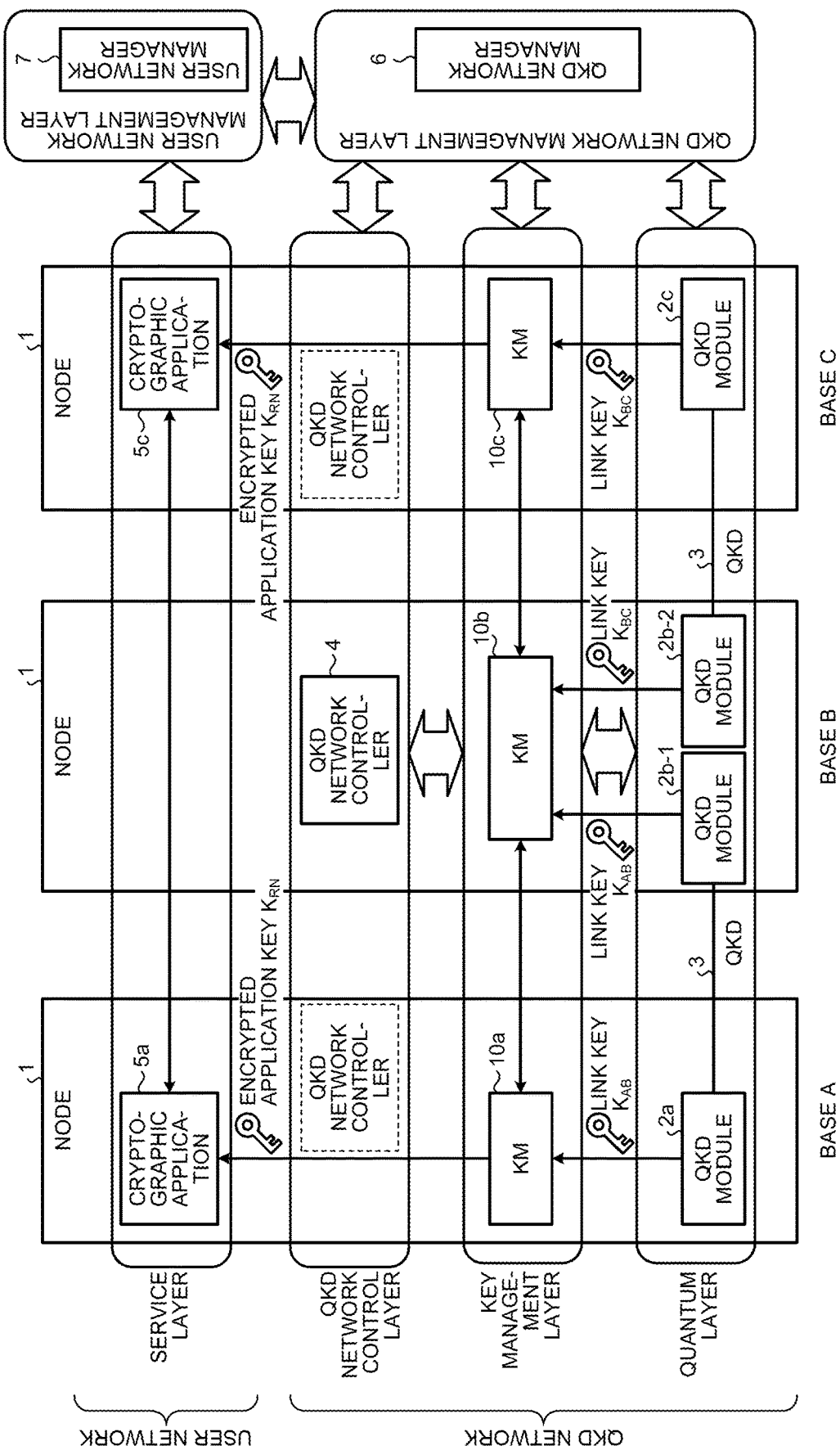

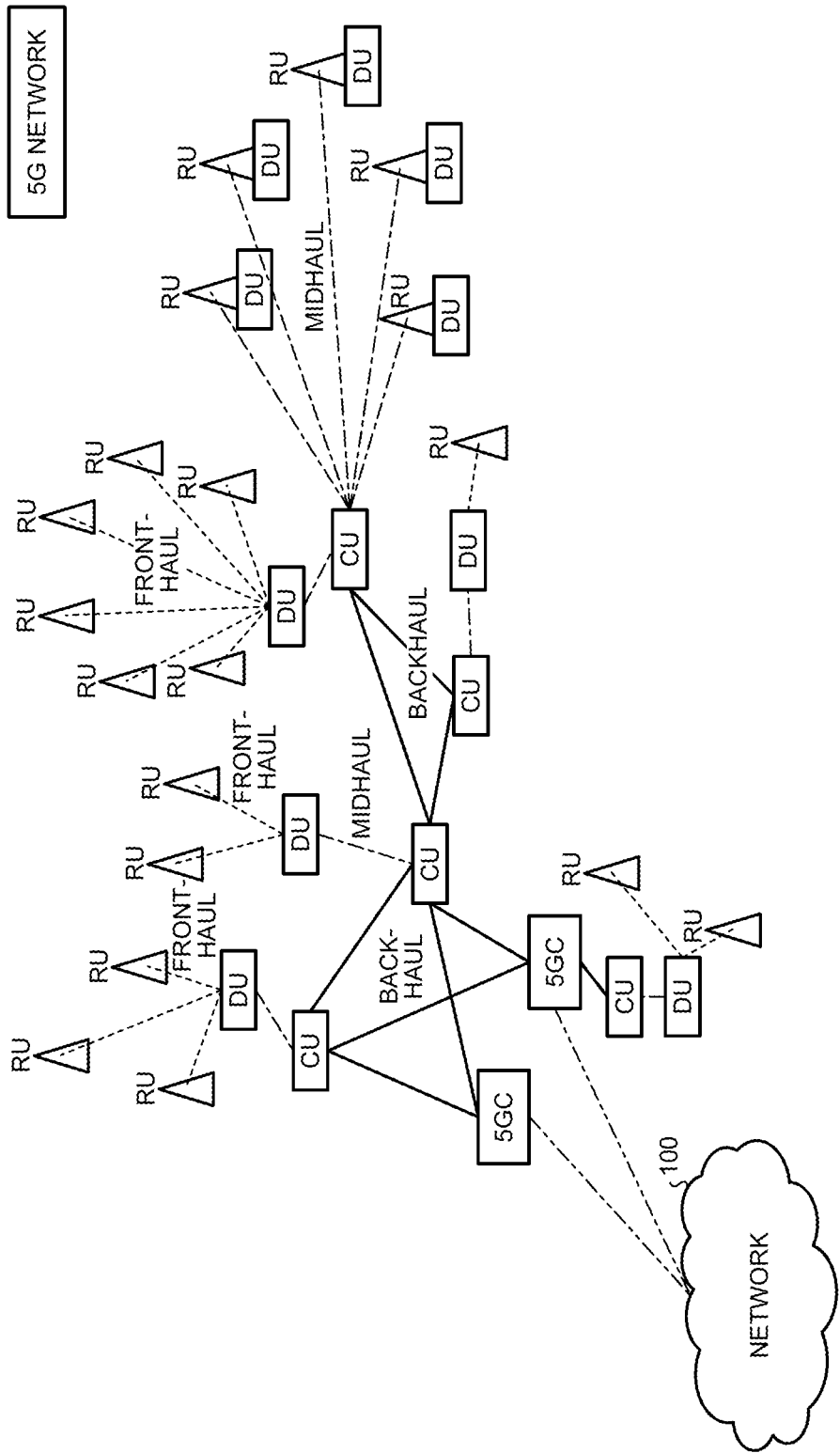

KEY MANAGEMENT DEVICE, QUANTUM CRYPTOGRAPHY COMMUNICATION SYSTEM, AND PROGRAM

CROSS-REFERENCE TO RELATED APPLICATIONS

This application is based upon and claims the benefit of priority from Japanese Patent Application No. 2022-042882, filed on Mar. 17, 2022; the entire contents of which are incorporated herein by reference.

FIELD

Embodiments described herein relate generally to a key management device, a quantum cryptography communication system, and a program.

BACKGROUND

There is a quantum key distribution (QKD) technology that securely shares an encryption key between a transmitting node that continuously transmits a single photon and a receiving node that receives the single photon connected by an optical fiber. In addition, there is a technique by which a node generates a random number (encryption key) independently of an encryption key shared by QKD, and transmits the generated random number to another node to share the random number. In a quantum cryptography communication network (QKDN: Quantum Key Distribution Network) using the QKD technology, the generated encryption key is supplied to a top service layer. An application in the service layer can implement secure communication with another application by using the encryption key (application key). The service layer is, for example, a user network such as the Internet.

However, in the conventional technology, it has been difficult to more suitably distribute the application key shared by the QKD.

BRIEF DESCRIPTION OF THE DRAWINGS

FIG. 1 is a diagram illustrating an example of a configuration of a quantum cryptography communication system according to an embodiment;

FIG. 2D is a diagram illustrating an example of the configuration of the 5G network (in the case of SA) according to the embodiment;

DETAILED DESCRIPTION

Figure 2A:
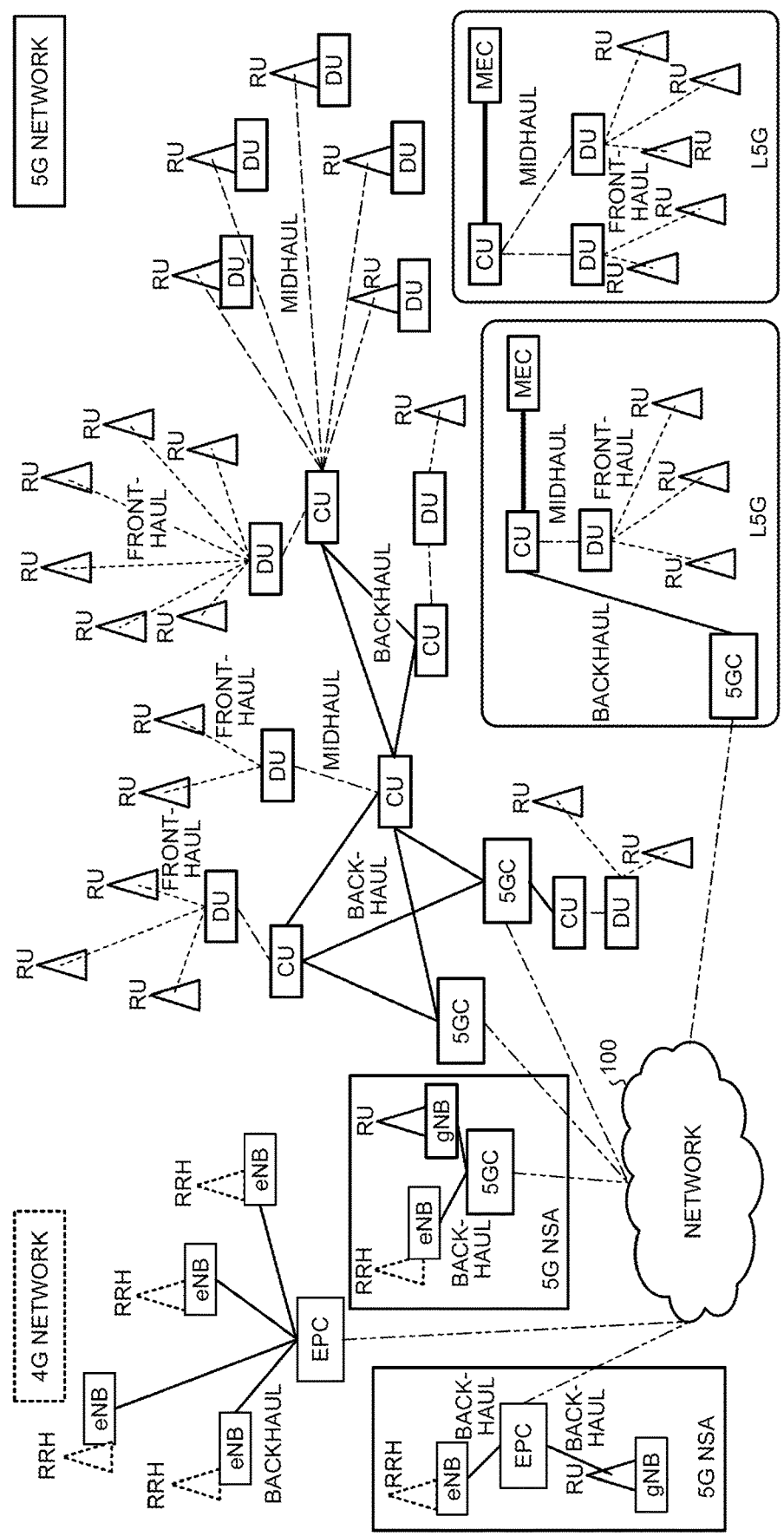
FIG. 2A is a diagram illustrating an example of an overall configuration of a user network according to the embodiment.

According to an embodiment, a key management device manages an application key used for encrypting communication of a user network including a plurality of cryptographic applications. The key management device includes one or more hardware processors configured to function as a plan acquisition unit, a plan execution unit, a communication unit, and a provision unit. The plan acquisition unit is configured to acquire a key distribution plan formulated based on state information indicating a state of the user network. The plan execution unit is configured to determine a distribution amount of the application key for each key sharing destination corresponding to a destination cryptographic application based on the key distribution plan. The communication unit is configured to encrypt the application key using a link key generated by quantum key distribution (QKD) and to transmit the encrypted application key to the key sharing destination. The provision unit is configured to provide the application key in response to a request from the cryptographic application.

Hereinafter, embodiments of a key management device, a quantum cryptography communication system, and a program will be described in detail with reference to the accompanying drawings.

In quantum key distribution, in order to share an application encryption key (hereinafter, referred to as "application key") used in a service layer, the application key in a QKD network is transferred. However, there is a gap between a transfer speed (provision speed) of the application key in the QKD network and a request speed (communication speed) of the key from a cryptographic application of the service layer in a 5G communication network.

One method for solving the problem that the key request speed is higher than the key provision speed is to share and accumulate the application key between key managers (KMs) in the QKD network in advance. A so-called KM is required to accumulate a Pre-Shared Key. Between the KMs, the sharing and accumulation of the application key continue up to the upper limit regardless of the presence or absence of a key request from the cryptographic application in an upper service layer. In this embodiment, when the application key is provided to a plurality of base stations in the 5G network, it is desirable to perform key distribution in a balanced and efficient manner in consideration of information such as a communication speed of the KM of a corresponding QKD network with a terminal related to the base station and the number of connected terminals. In addition, it is desirable that the key distribution can be dynamically adjusted according to a situation change of the 5G network.

Example of Configuration of Quantum Cryptography Communication System

FIG. 1 is a view illustrating an example of a configuration of the quantum cryptography communication system according to the embodiment. When viewed from the side, a QKD network architecture includes a quantum layer, a key management layer, a QKD network control layer, and a QKD network management layer for managing these three layers from the bottom. The application key is generated by these four layers and supplied to the service layer in an uppermost user network. When viewed vertically, three nodes 1 (QKD nodes/trusted nodes) including the QKD network and a user network are installed in a base A, a base B, and a base C, respectively.

The quantum layer includes QKD modules 2 and a QKD link 3 (QKD 3 in FIG. 1). A main function of the quantum layer is to exchange a photon and classical information (control information transmitted and received in a normal control link different from the QKD link) with the QKD module 2 at another base to share a link key (random number sequence). In addition, the quantum layer has the function of supplying the random number sequence to a key management device (KM) 10 (10a to 10c). The link key (quantum encryption key) shared by the QKD link 3 is guaranteed not to be eavesdropped based on the principle of quantum mechanics. When encrypted data communication is performed using a cryptography communication method called a one-time pad by using the shared link key, it is guaranteed by information theory that data to be transmitted and received cannot be deciphered even by an eavesdropper having any knowledge. The QKD modules 2 (2a, 2b-1, 2b-2, and 2c) are connected to each other by the QKD link 3 such as an optical fiber.

However, the method of sharing the link key in the QKD technology has a limitation on the distance with which the link key can be shared due to the use of a single photon as a medium. For example, as illustrated in the example of the quantum layer in FIG. 1, the QKD modules 2 are basically on a one-to-one basis; however, in the case of relaying, at least two QKD modules 2b-1 and 2b-2 are required in the base B that performs relaying. In the example of FIG. 1, a case where an application key $K_{RN}$ is supplied to the base A and the base C is illustrated. In the base B, the QKD module 2b-1 decrypts the application key encrypted in the base A with the same link key $K_{AB}$ (that is, a common key in which an encryption key and a decryption key are the same) as the base A. Then, the QKD module 2b-2 encrypts the decrypted application key again with the link key $K_{BC}$ and relays the encrypted application key $K_{RN}$ to the base C.

QKD has to sacrifice communication performance such as distance and speed to some extent to ensure unconditional safety. In general, a link key generation rate is about 200,000 to 300,000 bits per second (200 to 300 kbps) within a range of 50 km of a laid fiber. When a QKD key distillation process is hardware-optimized, a QKD key generation speed reaches a maximum of 10 Mbps in the case of a short distance. However, even at this maximum key generation speed, there is a large gap from the communication speed of 5G. In the case of the key relay, since there is encryption/decryption processing at the base where the relay is performed, the processing takes time.

The key management layer includes the key management devices (KMs) 10a to 10c and a KM link. Main functions of the key management layer include supply of the application key to cryptographic applications 5a and 5c that actually encrypt data, the key relay to another base via the KM link, and the like. Associated therewith, the key management devices (KMs) 10a to 10c perform overall key management such as reception of a key request from the cryptographic applications 5a and 5c and storage of an interface.

The QKD network control layer includes a QKD network controller 4 and a link. The QKD network control layer controls service of the whole QKD network. The QKD network controller may be provided in each base, or one (or a plurality of) QKD network controller(s) may be provided in the entire quantum cryptography communication system as illustrated in FIG. 1. The QKD network controller 4 and the KM 10 may be integrally realized.

The QKD network management layer includes a QKD network manager 6. The QKD network management layer has the functions of collecting performance information from each layer, monitoring whether the service is operating properly, and commanding control to the QKD network control layer as needed. A plurality of the QKD network managers 6 may exist according to a configuration of the QKD network. The function of the QKD network manager 6 may be realized and implemented by the KM 10.

The service layer has different configurations depending on a user and includes cryptographic applications 5a and 5c for realizing encrypted communication, a computer module, and the like. Furthermore, the service layer has the functions of encrypting the application key with the link key and transferring the encrypted application key to the adjacent node. The cryptographic application 5 of the service layer may separately generate the encryption key (application key) different from the link key from random number information and the like regardless of the QKD.

The architecture illustrated in FIG. 1 indicates basic elements. Actually, the configuration of the architecture may change depending on a situation. For example, the number of bases is not limited to three. Further, for example, the number of cryptographic applications 5 is not limited to two. Furthermore, for example, the number of QKD network managers in the QKD network management layer is not limited to one.

When the user network is a cellular communication network, a quantum cryptography communication network can be constructed for a part utilizing the optical fiber in the cellular communication network except for a part of wireless communication. As a result, it is possible to provide the application key to the part utilizing the optical fiber in the cellular communication network.

Next, a configuration example of the user network handled in the present embodiment will be described with reference to FIGS. 2A to 2E.

Example of User Network

FIG. 2A is a diagram illustrating an example of an overall configuration of the user network according to the embodiment. FIG. 2A illustrates a case where the user networks are 4G and 5G networks that are representative examples of the cellular communication networks.

4G is a fourth generation mobile communication system, and 5G is a fifth generation mobile communication system. In FIG. 2A, a situation in which 4G and 5G coexist will be described as an example.

Figure 2B:
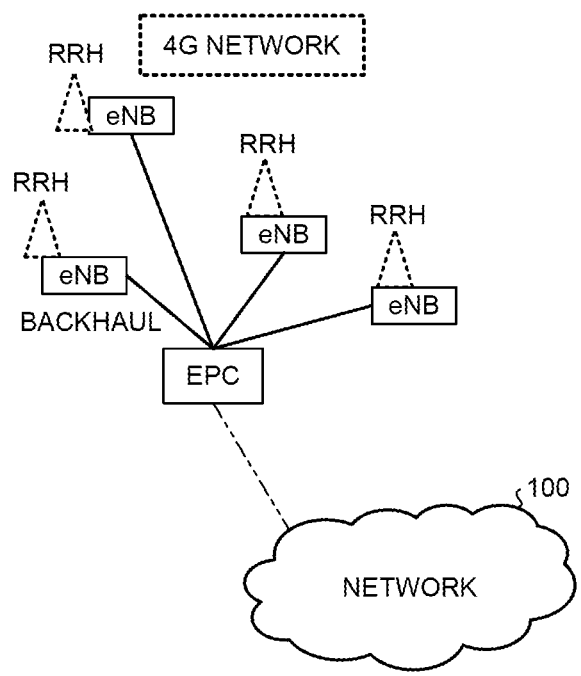
FIG. 2B is a diagram illustrating an example of a basic configuration of a 4G network according to the embodiment.

The cellular communication network basically includes a core network and a radio access network (RAN). FIG. 2B illustrates an example of a basic configuration of the 4G network. An evolved packet core (EPC) is a 4G IP-based core network. An eNB (eNodeB) that is a 4G base station in the RAN includes a remote radio head (RRH) that processes a radio frequency (RF) and a base band unit (BBU) that processes other than the radio frequency (RF).

Figure 2C:
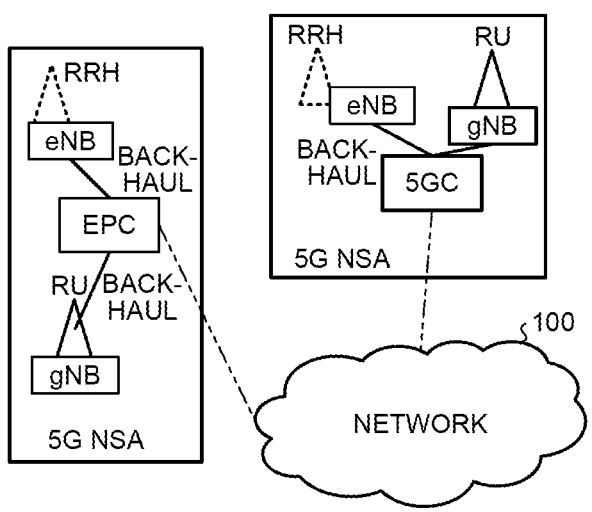
FIG. 2C is a diagram illustrating an example of a configuration of a 5G network (in the case of NSA) according to the embodiment.

The 5G network has two operations: a non-standalone (NSA) network that is partially shared with 4G, and a standalone (SA) network that is completely in a 5G configuration. In 5G NSA, as illustrated in FIG. 2C, there are a case where the core network uses the EPC of 4G and a case where the core network uses a 5G core (5GC) of 5G. In the RAN, an eNB base station configuration of 4G and a gNB (gNodeB) base station configuration of 5G coexist. To meet requirements such as transmission performance and low latency, the gNB places a function of the BBU in a central unit (CU) and a distributed unit (DU), and places a function of the RRH in a radio unit (RU). The DU performs real-time control and the like. The CU implements a non-real-time function and the like.

As illustrated in FIG. 2D, when a 5G environment is actually built, the CU and the DU or the DU and the RU are basically one-to-many. Depending on circumstances, the CU and the DU or the DU and the RU may be installed at the same location.

Figure 2E:
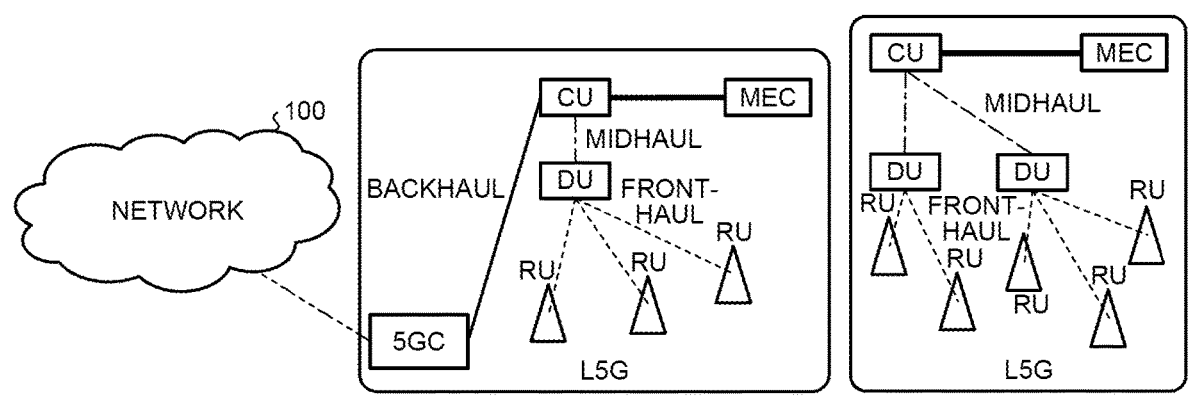
FIG. 2E is a diagram illustrating an example of the configuration of the 5G network (in the case of L5G) according to the embodiment.

A fronthaul, a midhaul, and a backhaul illustrated in FIGS. 2A to 2E are basically connected by the optical fiber. L5G illustrated in FIG. 2E is an abbreviation of local 5G or private 5G, and is a wireless system that constructs a unique 5G network in a specific area. In general, the configuration of the L5G is the same as that of a normal 5G network; however, the configuration may change due to special needs. For example, as illustrated in FIG. 2E, multi-access edge computing (MEC) is additionally provided to implement low latency. A terminal (mobile terminal), so-called user equipment (UE), is wirelessly communicating with the RRH of 4G or the RU of 5G. In the embodiment, the QKD is not introduced into communication of a radio part.

Since 4G and 5G use different frequency bands, communication ranges of antennas are different. In the case of a band of 6 GHz or less called Sub6, the communication range is a range of several kilometers for both 4G and 5G. In a case where a millimeter wave unique to 5G is used, the communication range of the antenna is only several hundred meters.

Example of Configuration of Key Management Layer and Service Layer

Figure 3:
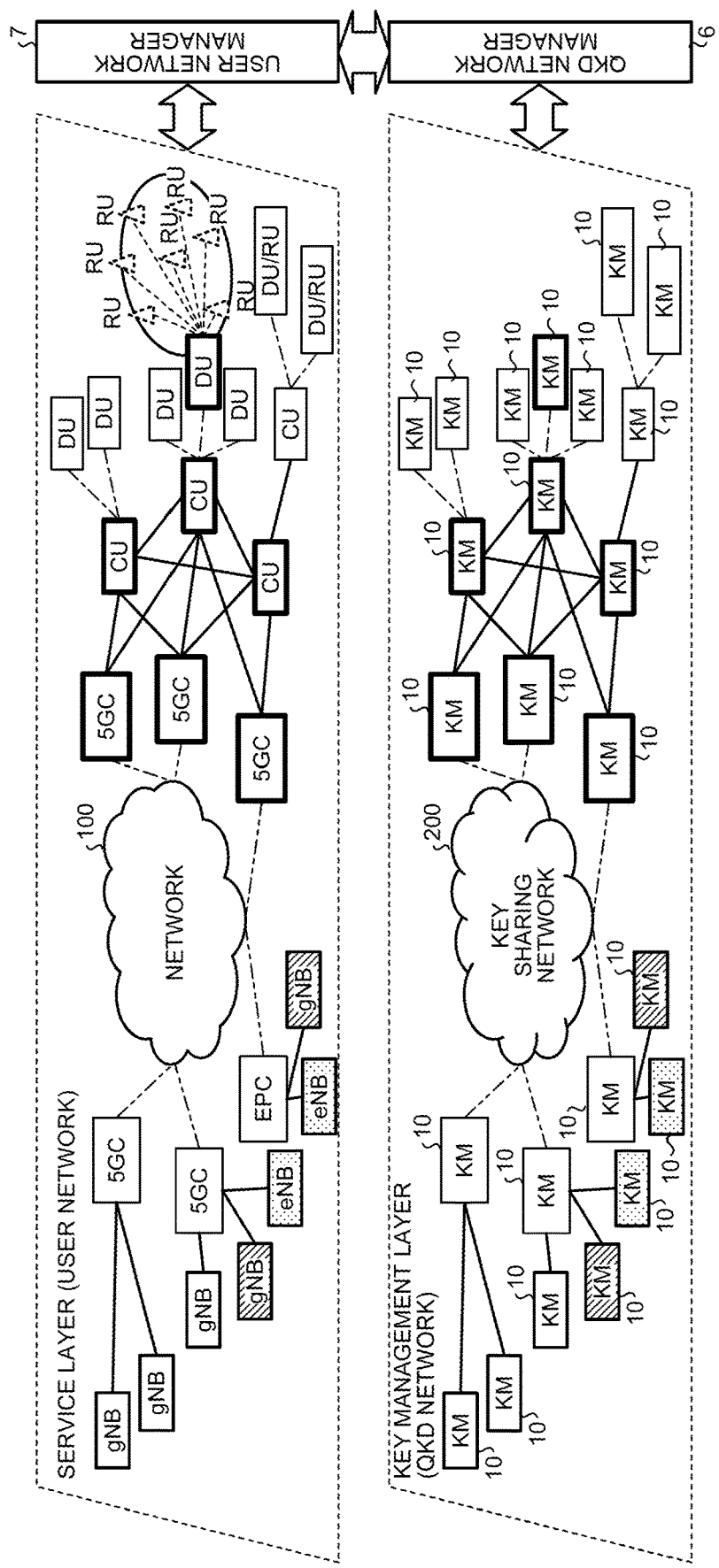
FIG. 3 is a diagram illustrating an example of a configuration of a key management layer and a service layer according to the embodiment.

FIG. 3 is a diagram illustrating an example of a configuration of the key management layer (QKD network) and the service layer (user network) according to the embodiment. The example of FIG. 3 illustrates a configuration in the key management layer and a configuration in the cellular communication network (an example of the user network) which is an upper layer of the key management layer.

The QKD network is introduced into cryptography communication in a network 100 (for example, the Internet) in the service layer. That is, the network 100 in the service layer corresponds to a key sharing network 200 in the key management layer.

That is, for a route arriving at the destination core network/base station via the network 100 in the service layer, there is also a route to the KM of the destination core network/base station via the key sharing network 200 in the key management layer accordingly. When it is considered that the QKD network is introduced into the core network in the cellular communication network or a portion where the optical fiber of the RAN is connected, the QKD network can be introduced into the RU and the RRH; however, in the embodiment, a case where the QKD network is introduced into the DU and the BBU will be described as an example.

On the left side of the network 100 of the service layer, the 5G and 4G networks coexist, and the 5GC and the EPC that are the core networks exist. In addition, the left side of the network 100 of the service layer includes the base stations (gNB and eNB).

The right side of the network 100 is only the 5G network, and the base stations are separately depicted as the CU, the DU, and the RU. In the key management layer, the corresponding KMs 10 are installed to match components of the service layer.

There is the QKD network manager 6 for a user network manager 7 of the service layer.

A key sharing method between the KMs 10 in the key management layer of the QKD network includes an on-demand key sharing method and a pre-shared key sharing method.

Processing Example of On-Demand Key Sharing Method

Figure 4:
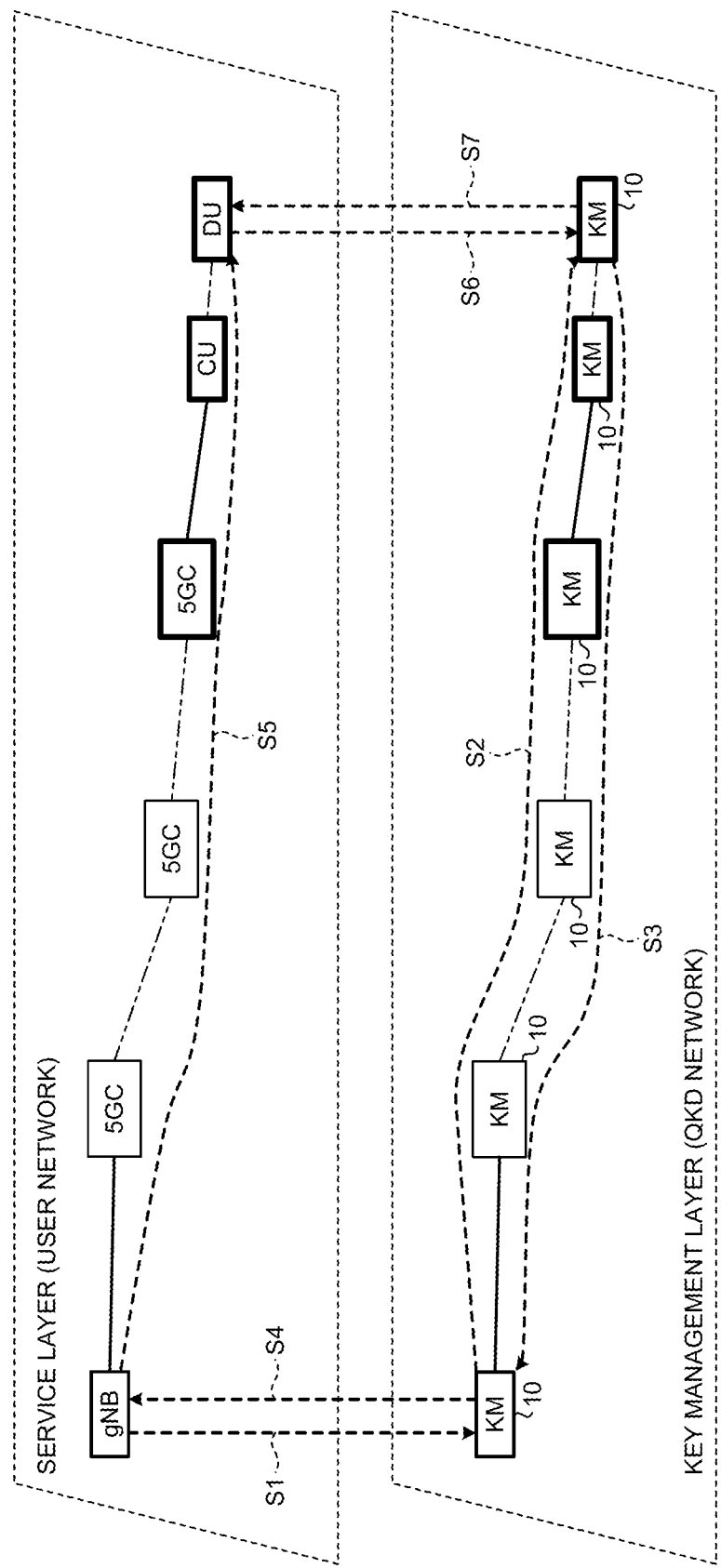
FIG. 4 is a diagram for describing a processing example of an on-demand key sharing method according to the embodiment.

FIG. 4 is a diagram for describing a processing example of the on-demand key sharing method according to the embodiment. In the on-demand key sharing method, first, key sharing is performed between the KMs 10 in the key management layer after there is a request from the service layer. As illustrated in FIG. 4, when secure communication in the cellular communication network is performed, first, the gNB of the service layer requests the application key from the KM 10 of the key management layer (step S1).

Next, in the QKD network, the application key is generated according to a request amount of the application key, and the application key is shared with the link key to the KM 10 corresponding to the destination DU (step S2). When the sharing of the application key is completed by the process of step S2, the KM 10 receives an acknowledgement (ACK) from the KM 10 corresponding to the destination DU (step S3) and provides the application key to the gNB of the service layer (step S4).

Next, the gNB encrypts the data with the application key provided from the KM 10 and transmits the encrypted data to the destination DU (step S5). Next, when the destination DU receives the encrypted data, the destination DU requests the KM 10 for the same application key as the application key provided to the gNB (step S6). Next, when the destination DU receives the application key from the KM 10, the destination DU decrypts the encrypted data with the application key (step S7).

Here, a processing speed at which the application key is shared up to the KM 10 corresponding to the destination DU is rate-limited by the generation speed of the link key in the QKD network. In particular, a delay due to a gap between a link key generation speed of the QKD network (key generation speed of the QKD (step S2)) and the communication speed of the cellular communication network (step S5) increases.

In order to reduce the delay, the pre-shared key sharing method is used.

Processing Example of Pre-Shared Key Sharing Method

Figure 5:
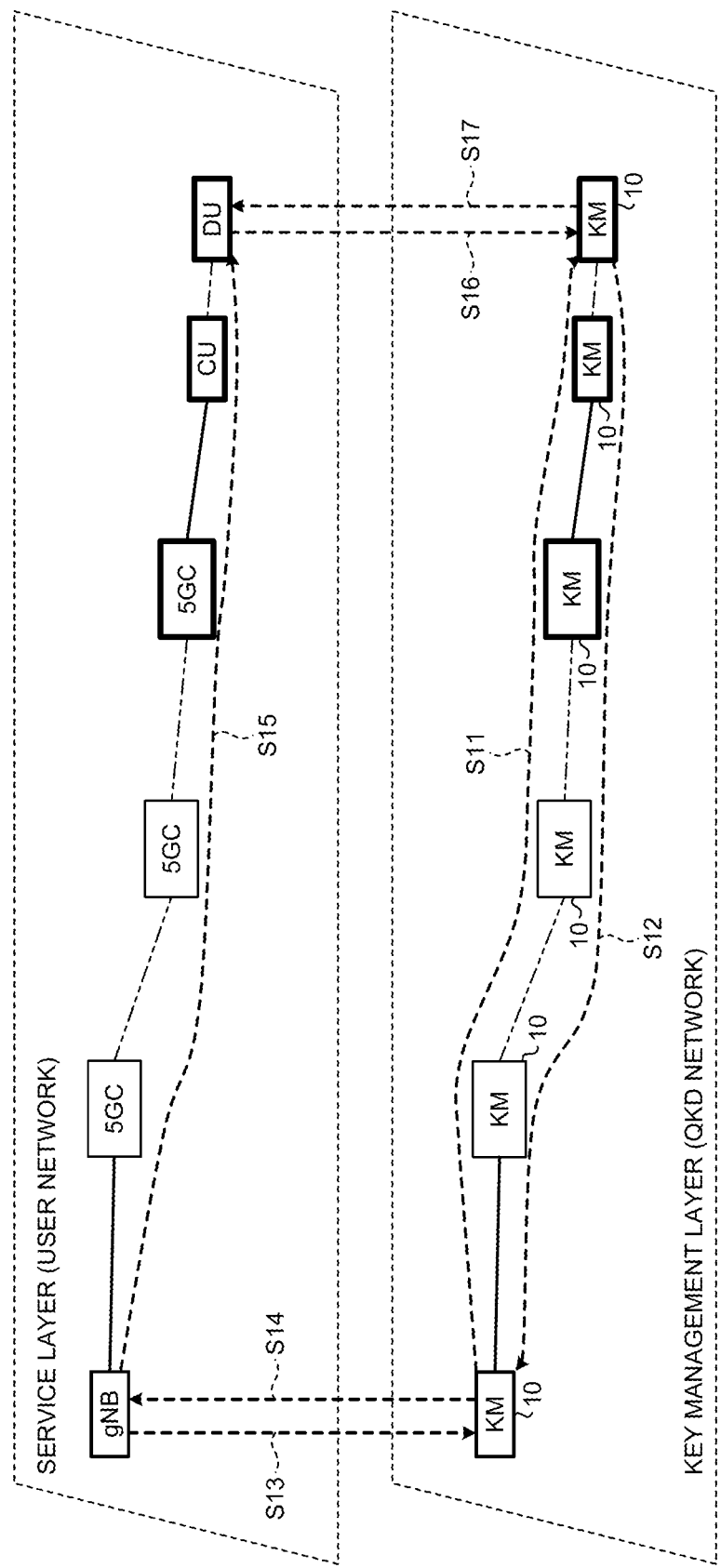
FIG. 5 is a diagram for describing a processing example of a pre-shared key sharing method according to the embodiment.

FIG. 5 is a diagram for describing a processing example of the pre-shared key sharing method according to the embodiment. The pre-shared key sharing method is a method in which sharing of the application key in the QKD network is started at the time when the network is completely constructed, and the application key is prepared in advance, regardless of the presence or absence of the application key request from the gNB of the service layer to the KM 10 of the key management layer.

First, the KM 10 continues to accumulate the application key up to the upper limit (steps S11 and S12). Thereafter, when the KM 10 receives the application key request from the gNB of the service layer (step S13), the KM 10 provides the application key to the gNB (step S14).

Since the description of steps S15 to S17 is similar to the description of steps S5 to S7 in FIG. 4, the description will be omitted.

In the pre-shared key sharing method, the delay can be shortened; however, in order for the QKD network to accumulate the application key in a balanced and efficient manner, it is necessary to consider a key distribution plan for each of the KMs 10.

Example of Controlling Accumulation Amount of Application Key

Figure 6:
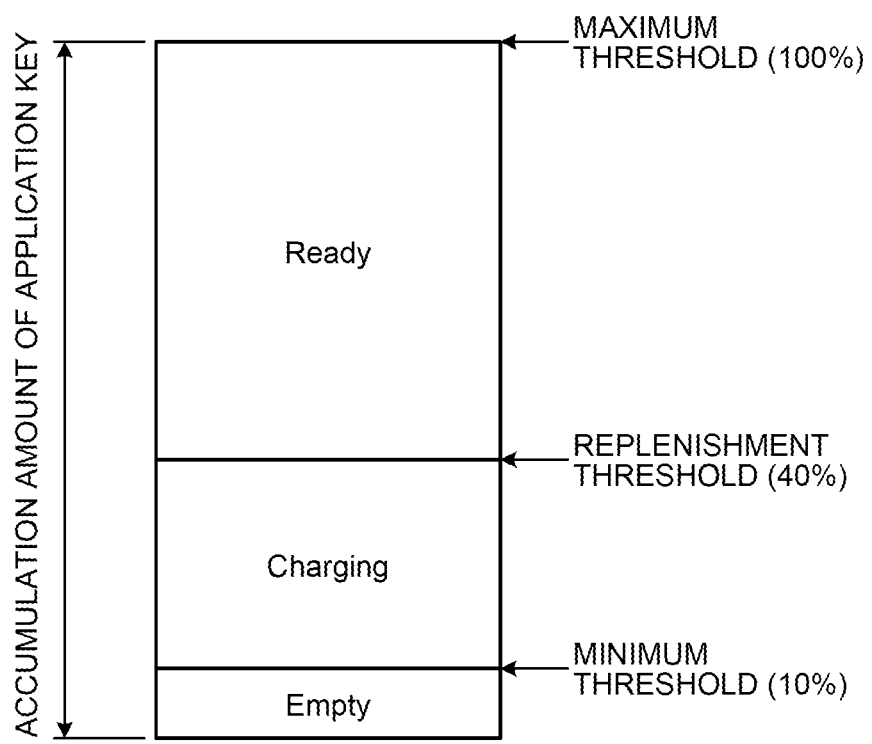
FIG. 6 is a diagram illustrating a control example of an accumulation amount of an application key according to the embodiment.

FIG. 6 is a diagram illustrating a control example of an accumulation amount of the application key according to the embodiment. The example of FIG. 6 illustrates a case where the accumulation amount of the application key is controlled by three thresholds (maximum threshold, replenishment threshold, and minimum threshold).

When the accumulation amount of the application key is larger than the maximum threshold, the KM 10 stops key sharing and key accumulation. When the accumulation amount of the application key is smaller than the maximum threshold and equal to or larger than the replenishment threshold, a state of the accumulation amount becomes "Ready", and the KM 10 can provide the application key to the upper layer.

When the accumulation amount of the application key is smaller than the replenishment threshold and equal to or larger than the minimum threshold, the state of the accumulation amount becomes "Charging", and the KM 10 can provide the application key to the upper layer. When the state of the accumulation amount is "Charging", key sharing and key accumulation are also resumed at the same time, and are continued up to the maximum threshold.

When the accumulation amount of the application key is smaller than the minimum threshold, the state of the accumulation amount becomes "Empty", and the KM 10 continues key sharing and key accumulation and stops providing the application key. In this case, the upper layer temporarily waits for replenishment of the application key.

Here, there is a problem of key distribution from the QKD network due to a difference in communication speed of the cellular communication network. As a specific example, since the communication speed between the base stations (gNB and eNB) of the service layer and the core network is different, the request amount (consumption amount) of the application key for the corresponding KM 10 within a certain period of time is also different. Not only the difference in the communication speed but also the number of terminals connected to the base station affect the request amount of the application key. It is necessary to formulate the key distribution plan of a suitable application key for the KM 10 corresponding to the base station based on the request amount of different application keys within a certain period of time.

Example of Functional Configuration

Figure 7:
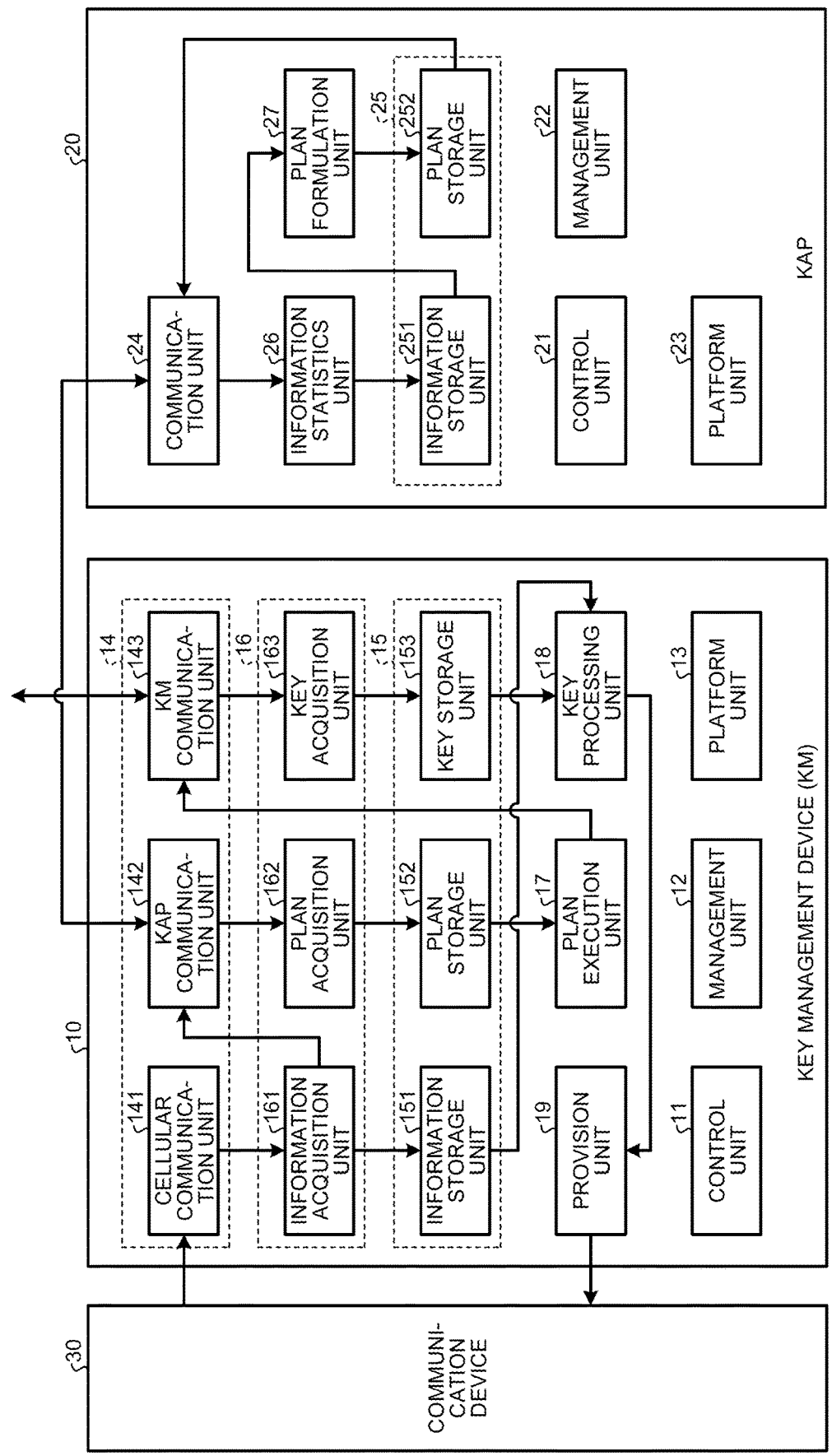
FIG. 7 is a diagram illustrating an example of functional configurations of a KM and a KAP according to the embodiment.

FIG. 7 is a diagram illustrating an example of functional configurations of the KM 10 and the KAP 20 according to the embodiment. First, an example of the functional configuration of the KM 10 included in the key sharing network 200 according to the embodiment will be described.

The key management device (KM) 10 according to the embodiment includes a control unit 11, a management unit 12, a platform unit 13, a communication unit 14, a storage unit 15, an acquisition unit 16, a plan execution unit 17, a key processing unit 18, and a provision unit 19.

The control unit 11 controls processing performed by the KM 10. For example, the control unit 11 is responsible for activating each functional unit.

The management unit 12 manages resources such as the generation speed of the link key (quantum encryption key) of the link connected to the KM 10 and a key holding amount.

The platform unit 13 provides an operating system function, a basic network function, a security function, and other functions necessary for management and operation of functions on the KM 10.

The communication unit 14 includes a cellular communication unit 141, a KAP communication unit 142, and a KM communication unit 143.

The cellular communication unit 141 performs communication for sharing information with the unit (a communication device 30 such as the DU, the CU, and the BBU) having the partial function of the base station/the base station in the cellular communication network which is a top service layer.

The KAP communication unit 142 performs communication for sharing information with a key assignment planner (KAP) 20 of the QKD network manager in the QKD network management layer.

The KM communication unit 143 performs communication for sharing the encryption key (application key) with one or more KMs 10 in the key management layer of the QKD network.

The communication unit 14 may be realized without being divided into the above three configurations.

The storage unit 15 includes an information storage unit 151, a plan storage unit 152, and a key storage unit 153.

The information storage unit 151 stores state information fed back from the user network (in the embodiment, the cellular communication network). For example, the state information includes at least one of the number of terminals connected to the user network, the communication speed in the user network, a communication amount within a certain period of time in the user network, and identification information for identifying the terminal whose communication frequency is greater than a threshold. Furthermore, for example, the state information includes at least one of a change in the number of terminals connected to the user network, a change in the communication speed in the user network, a change in the communication amount within a certain period of time in the user network, and the identification information for identifying the terminal whose communication frequency is greater than the threshold.

In the embodiment, the state information is information indicating the state of the cellular communication network. The state information of the embodiment includes information of an upper service layer such as the number of connected UEs (mobile terminals), the communication speed of each UE, a destination to which communication has been performed in the past, a communication duration, and the communication amount from the unit having the partial function of the base station/the base station in the cellular communication network.

The plan storage unit 152 stores the key distribution plan received from the KAP 20 of the QKD network manager.

The key storage unit 153 stores the encryption key (application key) shared between the KMs 10.

The acquisition unit 16 includes an information acquisition unit 161, a plan acquisition unit 162, and a key acquisition unit 163.

The information acquisition unit 161 acquires the state information from the communication device 30 included in the upper service layer (cellular communication network).

The plan acquisition unit 162 acquires the key distribution plan of the application key from the KAP 20 of the QKD network manager 6 in the QKD network management layer.

The key acquisition unit 163 acquires the encryption key (application key) shared with one or more KMs 10 in the key management layer of the QKD network.

The plan execution unit 17 executes processing related to key sharing for each destination according to the key distribution plan received from the KAP 20 of the QKD network manager 6 in the QKD network management layer. For example, the plan execution unit 17 determines an application key distribution amount for each key sharing destination corresponding to the destination cryptographic application 5 based on the key distribution plan. Then, the plan execution unit 17 sets the distribution amount as the maximum threshold, sets the replenishment threshold to a value smaller than the maximum threshold, and sets the minimum threshold to a value smaller than the replenishment threshold. In this case, when the accumulation amount of the application key is larger than the maximum threshold, the communication unit 14 stops processing of transmitting the application key to the key sharing destination. When the accumulation amount of the application key is smaller than the replenishment threshold, the communication unit 14 starts processing of transmitting the application key to the key sharing destination. When the accumulation amount of the application key is smaller than the minimum threshold, the provision unit 19 stops processing of providing the application key.

The key processing unit 18 performs processing of a key provision amount, a provision time, a provision destination, and the like in accordance with a request from the unit having the partial function of the base station/the base station in the cellular communication network, and passes the encryption key (application key) to the provision unit 19. Specifically, the key processing unit 18 determines a provision amount of the application key, a provision time for providing the application key to the cryptographic application 5, and a destination indicating a provision destination of the application key in response to a request from the cryptographic application 5.

When the provision unit 19 receives the encryption key (application key) from the key processing unit 18, the provision unit 19 provides the encryption key (application key) to the unit having the partial function of the base station/the base station in the cellular communication network which is the service layer. For example, the provision unit 19 provides the application key of the provision amount determined by the key processing unit 18 to the provision destination determined by the key processing unit 18 by the provision time determined by the key processing unit 18. The function of the provision unit 19 may be included in the communication unit 14.

Next, a configuration of the KAP 20 included in the QKD network manager 6 according to the embodiment will be described. The KAP 20 according to the embodiment includes a control unit 21, a management unit 22, a platform unit 23, a communication unit 24, a storage unit 25, an information statistics unit 26, and a plan formulation unit 27.

The control unit 21 controls processing performed by the KAP 20. For example, the control unit 21 is responsible for activating each functional unit.

The management unit 22 manages information of the KM 10 connected to the KAP 20, the number of KMs 10, and the like.

The platform unit 23 provides the operating system function, the basic network function, the security function, and other functions necessary for management and operation of functions on the KAP 20.

The communication unit 24 communicates with the one or more KMs 10. For example, the communication unit 24 performs communication for acquiring fed back of the state information from the cellular communication network. Furthermore, for example, the communication unit 24 performs communication for sharing the key distribution plan formulated by the plan formulation unit 27 with the one or more KMs 10.

The storage unit 25 includes an information storage unit 251 and a plan storage unit 252.

The information storage unit 251 stores the state information fed back from the one or more KMs 10. The plan storage unit 252 stores the key distribution plan.

The information statistics unit 26 acquires the state information from the one or more KMs 10.

The plan formulation unit 27 formulates (adjusts) the key distribution plan for each of the KMs 10 based on the state information. For example, the plan formulation unit 27 predicts the consumption amount of the application key based on at least one of the number of terminals connected to the user network, the communication speed in the user network, the communication amount within a certain period of time in the user network, and the identification information for identifying the terminal whose communication frequency is greater than the threshold, and formulates the key distribution plan according to the consumption amount of the application key. For example, the plan formulation unit 27 predicts the consumption amount of the application key based on at least one of the change in the number of terminals connected to the user network, the change in the communication speed in the user network, the change in the communication amount within a certain period of time in the user network, and the identification information for identifying the terminal whose communication frequency is greater than the threshold, and formulates the key distribution plan according to the consumption amount of the application key.

Each unit (the control unit 11, the management unit 12, the platform unit 13, the communication unit 14, the storage unit 15, the acquisition unit 16, the plan execution unit 17, the key processing unit 18, and the provision unit 19) of the KM 10 and each unit (the control unit 21, the management unit 22, the platform unit 23, the communication unit 24, the storage unit 25, the information statistics unit 26, and the plan formulation unit 27) of the KAP 20 may be realized by, for example, causing a control device such as a central processing unit (CPU) to execute a program, that is, by software, may be realized by hardware such as an integrated circuit (IC), or may be realized by using software and hardware in combination. The storage units 15 and 25 can be configured by any generally used storage medium such as a hard disk drive (HDD), an optical disk, a memory card, and a random access memory (RAM).

The configurations of the KM 10 and the KAP 20 in the present embodiment are merely examples, and modifications may be made to the configurations as appropriate.

First, a method of distributing the application key from the QKD network will be described for a case where there is a difference in the communication speed of the cellular communication network.

Figure 8:
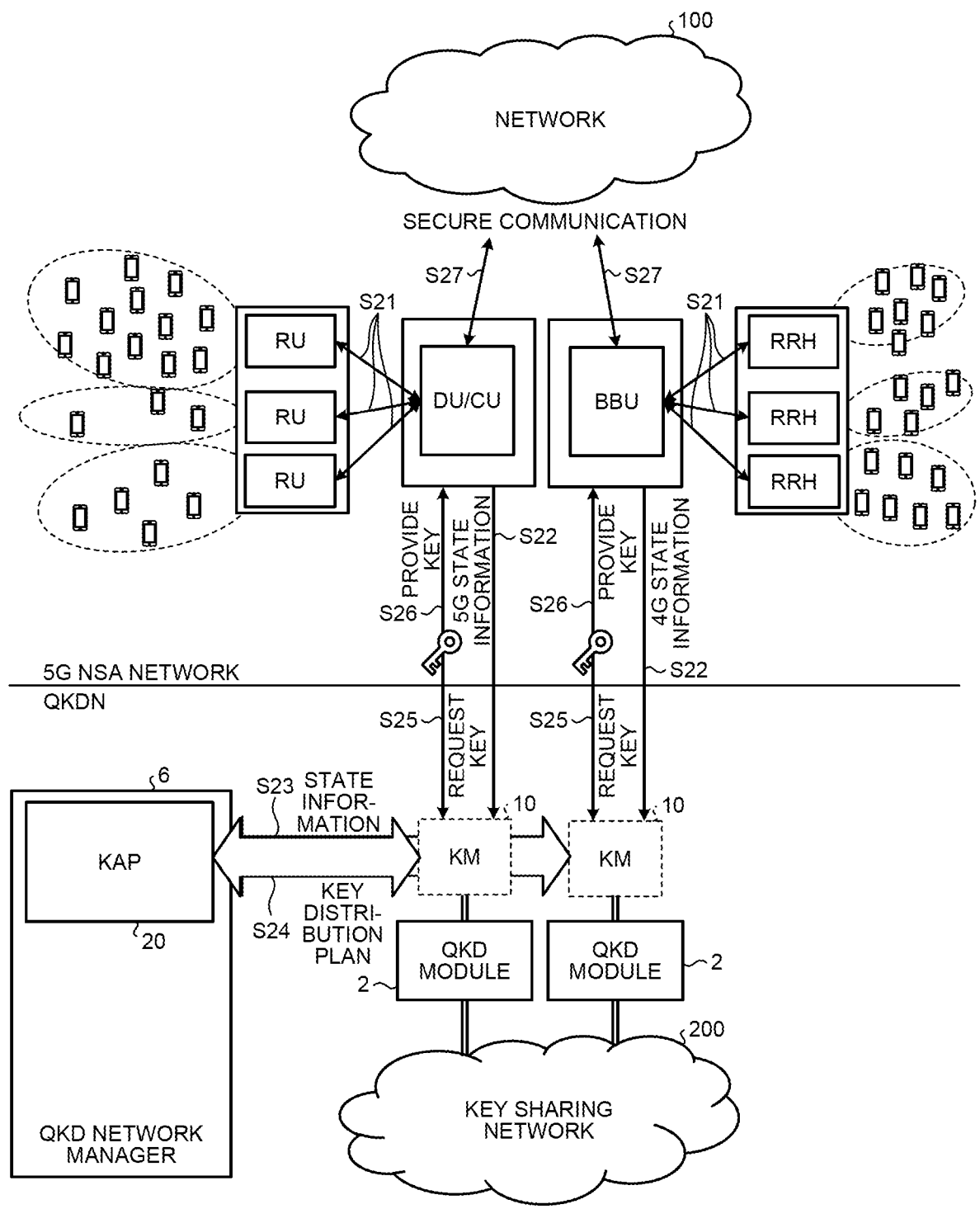
FIG. 8 is a diagram for explaining an example of an application key distribution method (in a case where there is a difference in communication speed) according to the embodiment.

FIG. 8 is a diagram for explaining an example of the application key distribution method (in a case where there is a difference in communication speed) according to the embodiment. An upper part of FIG. 8 is a 5G NSA network of the service layer, and requests the application key from the QKD network in a lower part of FIG. 8. The 5G NSA network uses the application key provided from the QKD network to perform secure communication.

The left side in the upper part of FIG. 8 is the 5G network, and three RUs cover the respective communication ranges and provide the 5G communication. A certain number of terminals within the communication range are wirelessly connected to the RU and communicate with the RU. The RU and DU/CU connected to the RU are included in the gNB of 5G. In the example of FIG. 8, it is assumed that the DU/CU is physically located at the same place. The terminal is connected to the gNB, and performs secure communication with another terminal via the network 100 through the 5GC.

Similarly, the right side in the upper part of FIG. 8 is the 4G network, and three RRHs cover the respective communication ranges and provide the 4G communication. A certain number of terminals within the communication range are wirelessly connected to the RRH and communicate with the RRH. The RRH and the BBU connected to the RRH are included in the eNB of 4G. The terminal is connected to the eNB, and performs secure communication with another terminal via the network 100 through the EPC. Certainly, the terminal in the left 5G network may communicate with the terminal in the right 4G network. Here, when 5G uses millimeter waves, the communication range of the left RU is narrowed. In the case of 5G, there is a high possibility that the number of terminals in the communication range is smaller than that of 4G.

The QKD network in the lower part of FIG. 8 includes the KM 10 in the key management layer, the QKD module 2 in the quantum layer, and the QKD network manager 6 in the QKD network management layer. There are KM 10 and QKD module 2 corresponding to each of the DU/CU and the BBU in the upper part of FIG. 8.

The KM 10 provides the application key to the DU/CU and the BBU. The QKD module 2 shares the application key to the destination using the key sharing network 200. The provision speed of the application key is limited to the link key generation speed of the QKD module 2. The QKD network manager 6 formulates an application key distribution plan for the QKD network.

Hereinafter, an example of a method of distributing the application key from the QKD network will be described.

First, the DU/CU collects 5G state information indicating a state of the 5G network from the RU, and similarly, the BBU collects 4G state information indicating a state of the 4G network from the RRH (step S21). The state information includes, for example, the number of UEs (including Roaming UE) connected to each of the RUs and the RRHs, the communication range of each of the RUs and the RRHs, a communication rate of each of the UEs in the past certain period, the destination to which communication has been performed in the past, the communication duration, the communication amount, and the like.

Next, the DU/CU takes the statistics of the 5G state information for a certain period of time and summarizes the 5G state information as information for the certain period of time, and similarly the BBU takes the statistics of the 4G state information for a certain period of time and summarizes the 4G state information as information for the certain period of time. In the case of the 5G network, the DU/CU feeds back the 5G state information to the KM 10 in the key management layer of the QKD network, and in the case of the 4G network, the BBU feeds back the 4G state information to the KM 10 in the key management layer of the QKD network (step S22).

Next, the KM 10 reports the 5G and 4G state information fed back in step S22 to the QKD network manager 6 (step S23).

Next, the KAP of the QKD network manager 6 formulates the key distribution plan (pre-shared key (PSK) plan) according to a key distribution algorithm of the application key based on the state information, and notifies each of the KMs 10 of the formulated key distribution plan (step S24). The key distribution algorithm related to the formulation of the key distribution plan will be described later.

Upon each of the KMs 10 receives the key distribution plan, each of the KMs 10 sets a maximum threshold, a replenishment threshold, and a minimum threshold regarding accumulation of the PSK for each destination according to a storage capacity and the like based on the key distribution plan. After the setting is completed, each of the KMs 10 starts sharing the application key and continues to accumulate the key up to the maximum value.

Next, when the UE performs secure communication, the DU/CU and the BBU request the application key from the KM 10 (step S25).

Next, each of the KMs 10 provides the application key in accordance with the request from the DU/CU and the BBU (step S26). When a remaining amount of the application key becomes equal to or less than the replenishment threshold, each of the KMs 10 resumes sharing of the application key and replenishes the application key.

Next, when the DU/CU and the BBU receive the application key from the KM 10, the DU/CU and the BBU encrypt communication data using the application key, and transmit the encrypted communication data to the destination DU/CU and BBU via the network 100 (step S27).

Next, the method of distributing the application key from the QKD network will be described for a case where a large number of terminals are concentrated in a short time in a certain case.

Figure 9:
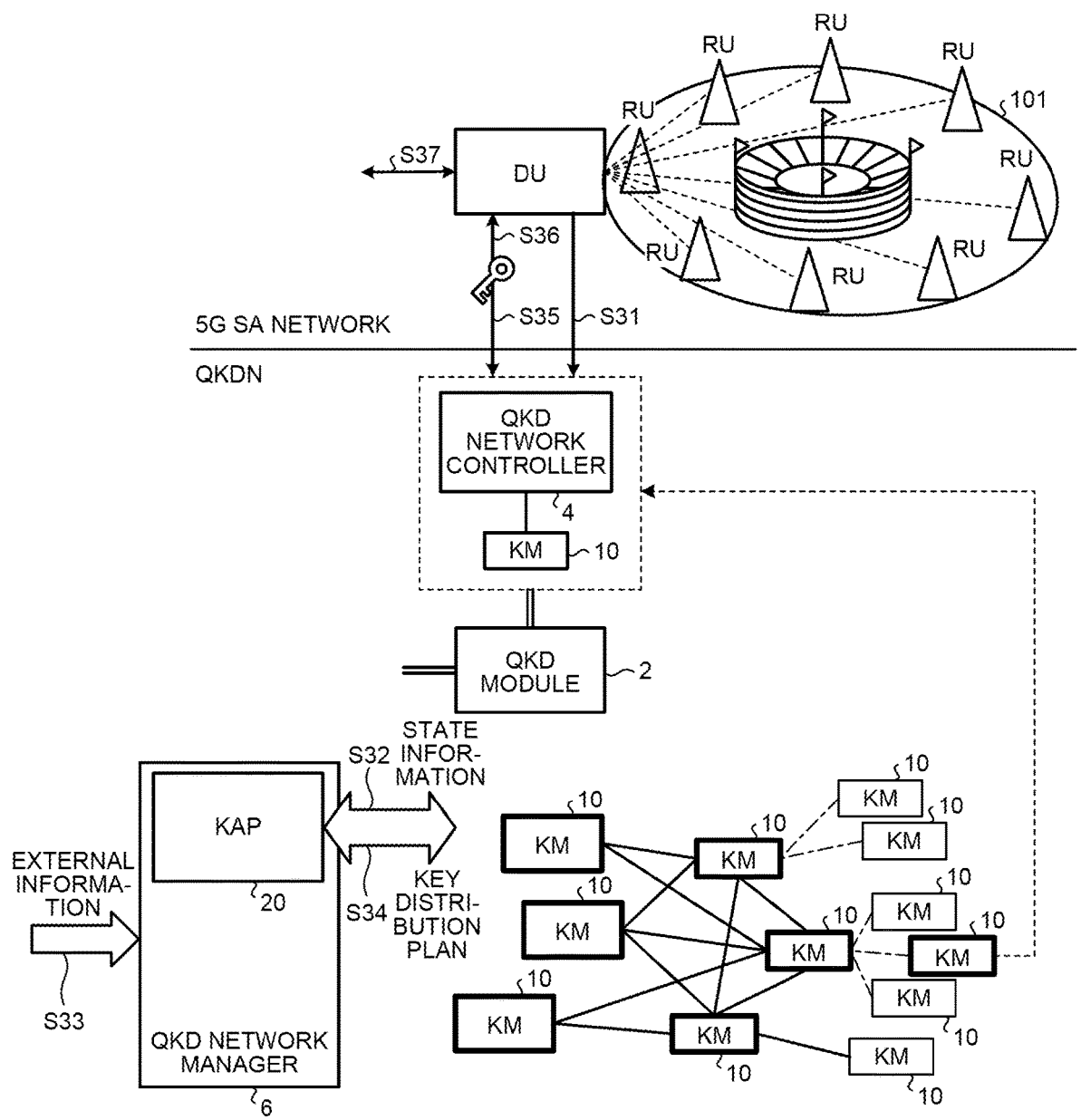
FIG. 9 is a diagram for explaining an example of the application key distribution method (in a case where the number of terminals changes) according to the embodiment.

FIG. 9 is a diagram for explaining an example of the application key distribution method (in a case where the number of terminals changes) according to the embodiment. For example, the DU is usually connected to a plurality of RUs. Each RU covers a certain range 101 and is wirelessly connected to the terminal in the range 101. For example, this range 101 includes a stadium. When an event is held in the stadium, a large number of terminals are concentrated in a short time. As the number of terminals rapidly increases, the communication amount also rapidly increases. Since there is a need for secure communication, there is a high possibility that the request amount of the application key to the corresponding KM 10 will also rapidly increase. In such a case, it is desirable to preferentially generate and share many application keys in the KM 10 at a location where the number of terminals rapidly increases.

An upper part of FIG. 9 is a 5G SA network of the service layer, and requests the application key from the QKD network in a lower part of FIG. 9. The 5G SA network uses the application key provided from the QKD network to perform secure communication.

The QKD network in the lower part of FIG. 9 includes the KM 10 in the key management layer, the QKD module 2 in the quantum layer, and the QKD network manager 6 in the QKD network management layer. There are KM 10 and QKD module 2 corresponding to each of the DU/CU and the BBU in the upper part of FIG. 8. FIG. 9 also depicts the plurality of KMs 10 associated with the KM 10 and the QKD network controller 4.

The DU in the 5G SA network is connected to the plurality of RUs. The RUs cover respective communication ranges and provide the 5G communication. A certain number of terminals within the communication range are wirelessly connected to the RU and communicate with the RU. When the quantity of terminals in an RU range rapidly increases at a certain time, the KM 10 corresponding to the DU and the plurality of KMs 10 associated with this KM 10 need to be correspondingly handled.

Hereinafter, an example of a method of distributing the application key from the QKD network will be described.

First, when the number of UEs connected to each RU within a certain period of time exceeds a prescribed threshold, the DU determines that the number of UEs connected to this RU greatly increases, and takes the statistics of a total value or an expected increase ratio of the number of UEs connected (including Roaming UE). The DU also takes the statistics of the state information other than the total value of the number of UEs. The state information other than the total value of the number of UEs includes, for example, the communication rate of each UE in the past certain period, the destination to which communication has been performed in the past, the communication duration, the communication amount, and the like. The DU immediately feeds back the state information to the KM 10 connected to the DU in the key management layer of the QKD network (step S31). For example, the DU first feeds back the state information on the expected increase ratio to the KM 10, and then feeds back other state information to the KM 10.

Next, the KM 10 reports the state information fed back in step S31 to the KAP 20 of the QKD network manager 6 (step S32). The KAP 20 of the QKD network manager 6 also requests the latest state information of the plurality of KMs 10 associated with the KM 10 reported in step S32, and receives the latest state information from the plurality of KMs 10.

Next, if the KAP 20 of the QKD network manager 6 can also receive the state information from the outside of the system illustrated in FIG. 9, the state information is received as external information (step S33). The external information includes, for example, event information (for example, information such as a schedule and an event scale), weather forecast, traffic jam information (for example, information indicating a place where many people gather), and the like from the home page of the stadium.

Next, the KAP 20 of the QKD network manager 6 formulates (adjusts) a new key distribution plan according to the key distribution algorithm based on the state information in steps S32 and S33, and promptly notifies each of the KMs 10 of the formulated key distribution plan (step S34).

Next, upon each of the KMs 10 receives the new key distribution plan, each of the KMs 10 sets the maximum threshold, the replenishment threshold, and the minimum threshold regarding accumulation of the PSK for each destination according to the storage capacity and the like based on the key distribution plan. After the setting is completed, each of the KMs 10 starts sharing the application key and continues to accumulate the key up to the maximum value.

Next, when the UE performs secure communication, the DU requests the application key from the KM 10 (step S35).

Next, each of the KMs 10 provides the application key in accordance with the request from the DU (step S36). When a remaining amount of the application key becomes equal to or less than the replenishment threshold, each of the KMs 10 resumes sharing of the application key and replenishes the application key.

Next, when the DU receives the application key from the KM 10, the DU encrypts the communication data using the application key, and transmits the encrypted communication data to the destination DU (step S37).

In the above processing example, the DU has the function of taking the statistics of the number of UEs, comparing the change amount within a certain period of time with a prescribed threshold related to determination of a drastic increase, and determining whether the drastic increase has occurred. This function may be provided in the KM 10 or in the QKD network manager 6.

Operation Example of KM

Figure 10:
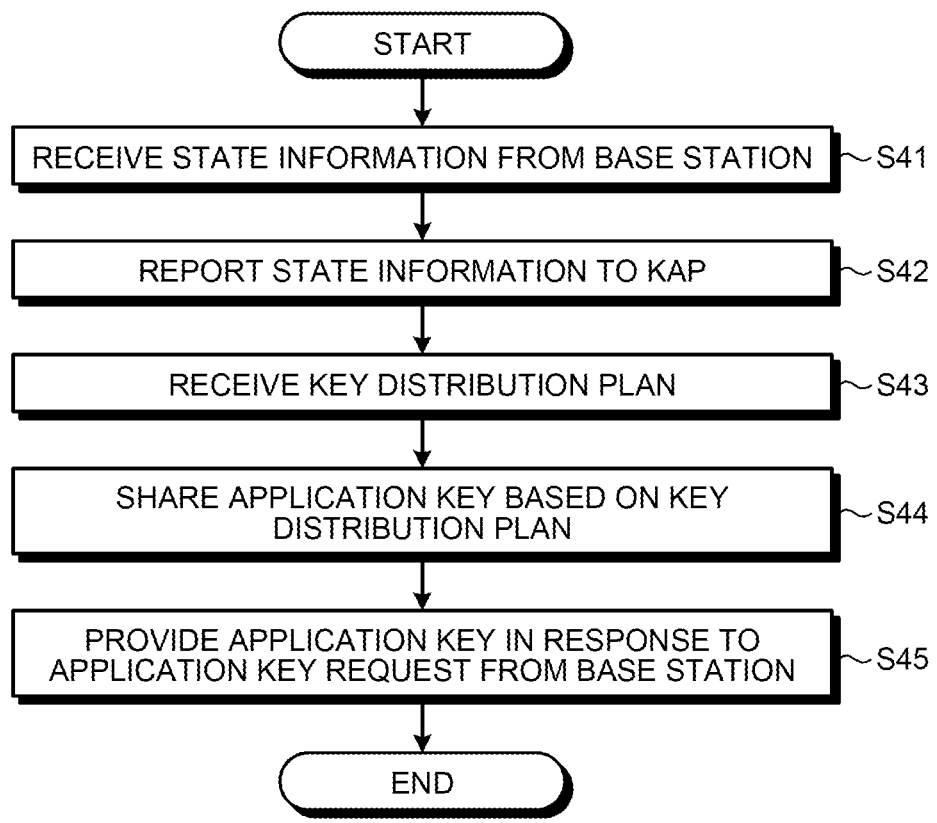
FIG. 10 is a flowchart illustrating an operation example of the KM according to the embodiment.

FIG. 10 is a flowchart illustrating an operation example of the KM 10 according to the embodiment. First, the cellular communication unit 141 of the KM 10 periodically receives the state information from the base station (step S41).

The state information periodically fed back from the base station by the processing in step S41 will be described. The state information of the base station connected to the certain KM 10 includes, as information within a certain period $\Delta T_j$, at least the total value of the UEs connected to the base station, an average value of the communication speeds of the base station and each UE, and the like.

A total value $N_j^{UE}$ of the UEs connected to the base station can be calculated by the following Formula (1).

$$N_j^{UE} = \sum_1^n \left( \sum_{a \in RU} \alpha + \sum \alpha_{in} - \sum \alpha_{out} \right) \tag{1}$$

The first term of Formula (1) indicates the number of UEs that can communicate within the communication range of the plurality of RUs (n RUs) connected to the base station. The second term of Formula (1) indicates the number of UEs (roaming UEs) that are scheduled to enter the communication range of the plurality of RUs within a certain period of time. The third term of Formula (1) indicates the number of UEs that are scheduled to leave the communication range of the plurality of RUs within a certain period of time.

The total value $N_j^{UE}$ of the UEs connected to the base station may be specified by a method other than the above Formula (1). For example, the total value $N_j^{UE}$ of the UEs may be estimated by estimating the number of UEs connected to each RU based on the communication range of each RU and summing the number of UEs.

A total communication speed value $R_j$ of the UE connected to the base station in a certain period $\Delta T_j$ can be calculated by the following Formula (2).

$$R_j = \sum_{1}^{n}\left(\sum_{\alpha \in RU} R_\alpha + \sum R_{in} - \sum R_{out}\right) \quad (2)$$

The first term of Formula (2) indicates the total communication speed value of the UEs that can communicate within the communication range of the plurality of RUs (n RUs) connected to the base station. The second term of Formula (2) indicates a communication speed requirement of the UE (roaming UE) scheduled to enter the communication range of the plurality of RUs within a certain period of time. The third term of Formula (2) indicates the communication speed requirement of the UE scheduled to leave the communication range of the plurality of RUs within a certain period of time.

However, there is an upper limit to the communication speed that can be provided from the base station. As shown in the following Formula (3), the total communication speed value $R_j$ of the UE connected to the base station in the certain period $\Delta T_j$ does not exceed a communication speed $R_{MAX}$ that can be provided from the base station.

$$R_j \leq R_{MAX} \quad (3)$$

The average value of the communication speeds of the base station and each UE may be an average value of the communication speeds of the UEs in the certain period $\Delta T_j$ (the following Formula (4)) or an average value of the communication speeds of the UEs in the immediately previous period $\Delta T_{j-1}$ of the certain period.

$$\bar{r}_j = \frac{R_j}{N_j^{UE}} \quad (4)$$

The average value of the communication speeds of the base station and each UE may be specified from communication speed reference values of the UE of 4G and the UE of 5G instead of the average value of the above Formula (4).

The KAP communication unit 142 of the KM 10 reports the state information (values of the above Formulas (1) and (4)) of the certain period $\Delta T_j$ to the KAP (step S42). This state information is an example, and other information may be included in the state information. The above formulas are an example, and a value calculated by another formula may be included in the state information. For example, a value calculated by a formula for calculating the communication amount of the base station in a certain period may be included in the state information.

The timing of reporting the state information in step S42 may be the timing immediately after the value is calculated, or may be the timing when the acquisition request for the state information is received from the KAP.

Next, the plan execution unit 17 of the KM 10 waits until receiving the key distribution plan from the KAP, and when the plan execution unit 17 receives the key distribution plan from the KAP (step S43), the plan execution unit 17 immediately shares the encryption key (application key) of the PSK between the KMs 10 based on the key distribution plan, and accumulates the application key (step S44).

Next, the cellular communication unit 141 of the KM 10 provides the application key in response to the application key request from the base station of the upper layer (step S45). After the plan execution unit 17 of the KM 10 provides the application key, the plan execution unit 17 resumes sharing of the application key and replenishes the application key when the accumulation amount of the application key becomes equal to or less than the replenishment threshold according to the key distribution plan.

Operation Example of KAP

Figure 11:
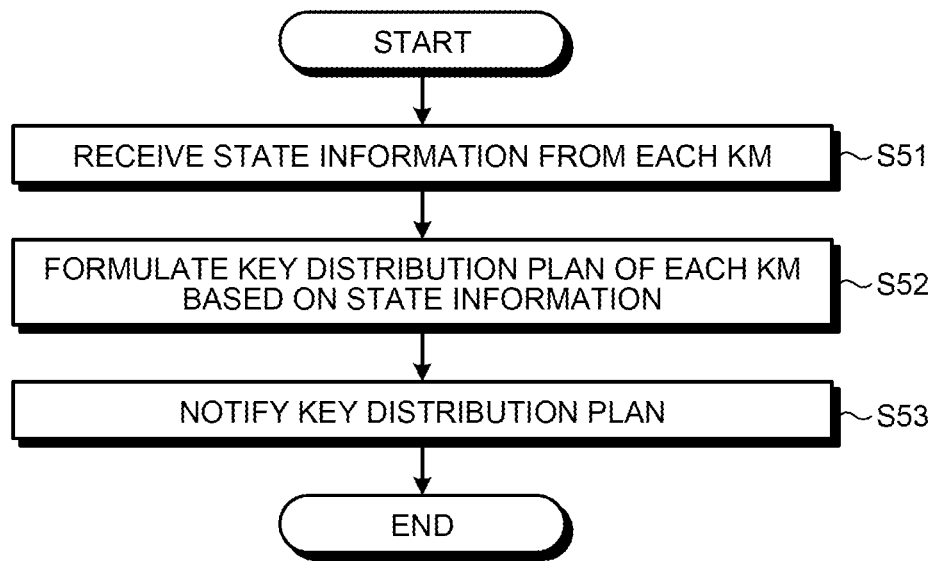
FIG. 11 is a flowchart illustrating an operation example of the KAP according to the embodiment.

FIG. 11 is a flowchart illustrating an operation example of the KAP 20 according to the embodiment. First, the communication unit 24 of the KAP 20 periodically receives the state information from each of the KMs 10 (step S51). In the above example, the communication unit 24 of the KAP 20 receives the state information (the total value of the UEs connected to the base station (the above Formula (1))) subjected to statistics at each of the periods $\Delta T_j$ and the average value of the communication speeds between the base station and each UE (the above Formula (4)). The communication unit 24 of the KAP 20 may receive information indicating a difference between the value in the period $\Delta T_{j-1}$ and the value in the period $\Delta T_j$, in step S51.

Next, the plan formulation unit 27 of the KAP 20 formulates the key distribution plan for each of the KMs 10 in accordance with the key distribution algorithm based on the state information from each of the KMs 10 (step S52).

Specifically, the key distribution plan includes a key distribution reference value $\delta_{j+1}^i$ calculated by the following Formula (5).

$$\delta_{j+1}^i = (\mu(N_j^{UE}) \times \sigma(\bar{r}_j)) \times \Delta T_j + \varphi \quad (5)$$

Since the KAP 20 generally manages the plurality of KMs 10, i denotes the i-th KM 10.

The key distribution reference value in the above Formula (5) is not based on actual application key needs, but is based on the communication amount of the base station predicted from a total number of UEs and an average communication speed in a certain period $\Delta T_j$. The key distribution reference value indicates a required amount of the application key predicted before secure communication is actually performed. Each of the KMs 10 continuously shares and accumulates the application key up to the key distribution reference value.

Thus, the plan formulation unit 27 may calculate the key distribution reference value of the next period $\Delta T_j$ based on the state information of the previous period $\Delta T_{j-1}$.

$\mu$ and $\sigma$ in the above Formula (5) are coefficients indicating weights. $\mu$ and $\sigma$ are adjusted according to the number of UEs performing actual secure communication, the communication speed, and the like. Here, for example, when the UE rapidly increases, the key distribution reference value can be adjusted by adjusting $\mu$ based on the fed back expected increase ratio. There is an advantage that a response can be made earlier by adjusting only the coefficient prior to the numerical value actually subjected to statistics.

φ in the above Formula (5) represents a minimum distribution reference value of the KM 10. That is, a minimum amount of the application key by φ is also accumulated in the base station to which the terminal is not connected or the base station not communicating with the terminal. A minimum key distribution reference value φ can be calculated, for example, according to the request amount of the application key actually requested from the base station to the KM 10 in a certain period of time in the past.

The key distribution plan may change depending on the state information fed back from the KM 10. That is, the key distribution plan may change periodically.

The key distribution plan includes a priority ratio $\omega_{j+1}^i$ calculated by the following Formula (6).

$$\omega_{j+1}^i = \frac{\delta_{j+1}^i}{\sum_{i \in QKDN} (\delta_{j+1}^i)} \times 100\% \qquad (6)$$

A priority ratio $\omega_{j+1}^i$ indicates a ratio (that is, the key distribution ratio) between the key distribution reference value $\delta_{j+1}^i$ of each of the KMs 10 managed by the QKD network manager 6 and the entire key distribution reference value.

The plan formulation unit 27 gives priority (degree of priority) to the application key distribution based on the priority ratio $\omega_{j+1}^i$, and stores the priority in a priority table. For example, if the priority ratio $\omega_{j+1}^i$ falls within a certain range, the plan formulation unit 27 gives the same priority to the KM 10 within the range. The KM 10 having a higher priority accumulates the application key first when performing key sharing of the PSK between the KMs 10.

The key distribution ratio of each of the KMs 10 may be calculated according to a connection status between the KMs 10. For example, when one parent KM 10 is connected to three child KMs 10, the plan formulation unit 27 first calculates the key distribution ratio of each of the child KMs 10 based on the key distribution reference value $\delta_{j+1}^i$ of the child KM 10. Then, the plan formulation unit 27 shares the application key between the parent KM and the child KM according to the key distribution ratio of each of the child KMs 10.

The plan formulation unit 27 formulates a key distribution reference value for each UE based on the key distribution reference value $\delta_{j+1}^i$. The plan formulation unit 27 calculates a key distribution reference value $Key_{j+1}^{UE}$ of each UE from the total value $N_j^{UE}$ of the UEs connected to the base station that requests the application key from the key distribution reference value $\delta_{j+1}^i$ and the KM 10 for the certain KM 10 by the following Formula (7).

$$Key_{j+1}^{UE} = \frac{\delta_{j+1}^i}{N_j^{UE}} \qquad (7)$$

The communication unit 24 notifies each of the KMs 10 of the key distribution plan including a key distribution priority (key distribution ratio) of each of the KMs 10, the key distribution reference value $\delta_{j+1}^i$, and the key distribution reference value $Key_{j+1}^{UI}$ for each UE related to each of the KMs 10 (step S53).

When the plan execution unit 17 of each of the KMs 10 receives the key distribution plan, the plan execution unit 17 sets a function (maximum threshold, replenishment threshold, and minimum threshold) for controlling accumulation of the application key for each UE in accordance with the key distribution reference value $Key_{j+1}^{UE}$ for each UE according to the key distribution reference value and its own capacity (within the upper limit value of the key storage unit), and shares the application key up to the KM 10 corresponding to a communication destination base station.

The plan formulation unit 27 may not formulate the key distribution reference value $Key_{j+1}^{UE}$ for each UE by the above Formula (7), but may take the statistics of the destination base station having a higher communication frequency and formulate the key distribution reference value $Key_{j+1}^{UE}$ for each of the KMs 10 corresponding to the destination base station. For example, the plan formulation unit 27 receives information on the destination base station whose communication frequency is greater than the threshold from each of the KMs 10, and calculates a communication ratio to each destination base station (communication ratio to the destination base station based on the total communication amount). Then, the plan formulation unit 27 sets the key distribution reference value $Key_{j+1}^{UE}$ for each destination base station as the key distribution reference value $\delta_{j+1}^i \times$ the value of the communication ratio to the destination base station.

The formulation of a part of the key distribution plan performed by the KAP 20 may be performed on the KM 10 side. For example, the formulation of the key distribution reference value $Key_{j+1}^{UE}$ for each UE or the formulation of the key distribution reference value $Key_{j+1}^{UE}$ for each of the KMs 10 corresponding to the destination base station may be executed in the KM 10.

The above calculation formulas (1) to (7) are examples, and the present embodiment is not limited thereto. For example, another formula for determining a key distribution ratio may be used in consideration of an actual key request amount and the communication amount of the base station.

As described above, the key management device (KM) 10 according to the embodiment is a key management device for managing the application key used for encrypting communication of the user network including the plurality of cryptographic applications 5. The key management device (KM) 10 includes the plan acquisition unit 162, the plan execution unit 17, the communication unit 14, and the provision unit 19. The plan acquisition unit 162 acquires the key distribution plan formulated based on the state information indicating the state of the user network. The plan execution unit 17 determines the application key distribution amount for each key sharing destination corresponding to the destination cryptographic application 5 based on the key distribution plan. The communication unit 14 encrypts the application key using the link key generated by the QKD, and transmits the encrypted application key to the key sharing destination. The provision unit 19 provides the application key in response to a request from the cryptographic application 5.

As a result, according to the key management device (KM) 10 according to the embodiment, it is possible to more suitably distribute the application key shared by the QKD. For example, when the user network is a cellular communication network, the state information is fed back from the cellular communication network, and the state information is shared between the KM 10 and the KAP 20. Then, the key distribution plan for each of the KMs 10 is formulated (adjusted), and the application key is shared and accumulated based on the key distribution plan. As a result, the key distribution plan regarding key sharing and key accumulation is formulated (adjusted) in a balanced and efficient manner. In addition, the key distribution plan is also dynamically formulated (adjusted) according to a state change of the 5G network.

First Modification of Embodiment

Next, a first modification of the embodiment will be described. In the description of the first modification, the description similar to that of the embodiment will be omitted, and portions different from those of the embodiment will be described.

Figure 12A:
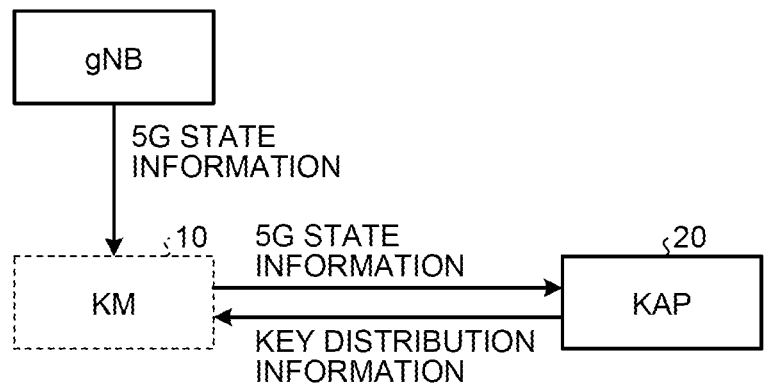
FIG. 12A is a diagram for explaining a first modification of the embodiment.

FIG. 12A is a diagram for explaining the first modification of the embodiment. FIG. 12A illustrates a modification in which the KM 10 shares the encryption key (application key) between the KMs 10 based on the key distribution plan and accumulates the application key.

In FIG. 12A, description will be made according to the architecture of the 5G network. In the first modification, the base station feeds back the 5G state information to the KM 10, and the KM 10 transmits the fed back 5G state information as it is to the KAP 20. Then, the KAP 20 takes the statistics of the 5G state information, formulates the key distribution plan, and shares the key distribution plan with the KM 10.

Second Modification of Embodiment

Next, a second modification of the embodiment will be described. In the description of the second modification, the description similar to that of the embodiment will be omitted, and portions different from those of the embodiment will be described.

Figure 12B:
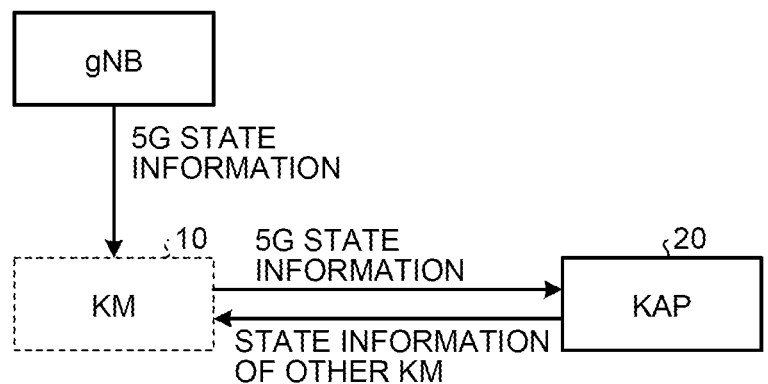
FIG. 12B is a diagram for explaining a second modification of the embodiment.

FIG. 12B is a diagram for explaining the second modification of the embodiment. In FIG. 12B, description will be made according to the architecture of the 5G network. In the second modification, the base station feeds back the 5G state information to the KM 10, and the KM 10 transmits the fed back 5G state information as it is to the KAP 20. The KAP 20 shares not only the 5G state information from the KM 10 but also the 5G state information from other KMs 10 with each of the KMs 10. The KM 10 formulates the key distribution plan based on the 5G state information received from the KAP 20 and its own 5G state information. Thereafter, the KM 10 shares the application key of the PSK between the KMs 10 based on the key distribution plan and accumulates the application key.

Third Modification of Embodiment

Next, a third modification of the embodiment will be described. In the description of the third modification, the description similar to that of the embodiment will be omitted, and portions different from those of the embodiment will be described.

Figure 12C:
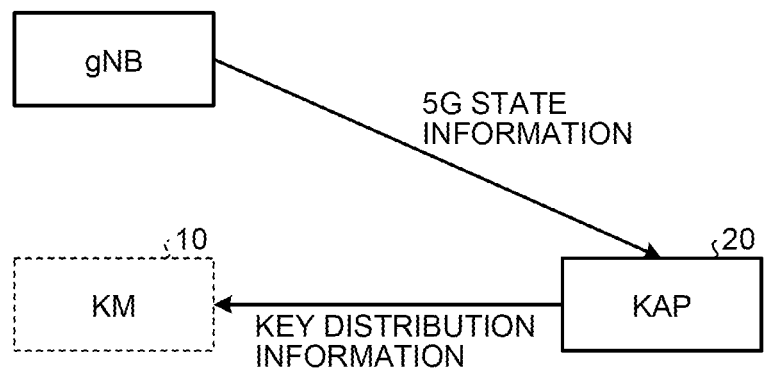
FIG. 12C is a diagram for explaining a third modification of the embodiment.

FIG. 12C is a diagram for explaining the third modification of the embodiment. In FIG. 12C, description will be made according to the architecture of the 5G network. In the third modification, the base station directly feeds back the 5G state information to the KAP 20. The KAP 20 takes the statistics of the 5G state information from each base station, formulates the key distribution plan, and shares the formulated key distribution plan with each of the KMs 10 corresponding to each base station. The KM 10 shares the application key of the PSK between the KMs 10 based on the key distribution plan and accumulates the application key.

The user network manager 7 in the service layer may directly fed back the 5G state information on each base station to the KAP 20 of the QKD network manager 6 in the key management layer.

Fourth Modification of Embodiment

Next, a fourth modification of the embodiment will be described. In the description of fourth modification, the description similar to that of the embodiment will be omitted, and portions different from those of the embodiment will be described.

Figure 12D:
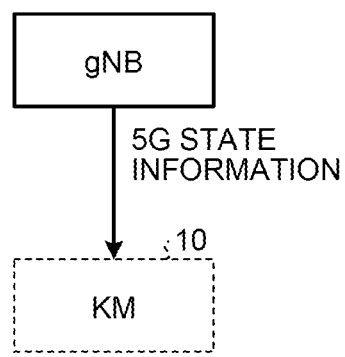
FIG. 12D is a diagram for explaining a fourth modification of the embodiment.

FIG. 12D is a diagram for explaining the fourth modification of the embodiment. In FIG. 12D, description will be made according to the architecture of the 5G network. In the fourth modification, the base station feeds back the 5G state information to the KM 10, and the KM 10 takes the statistics of the 5G state information to formulate the key distribution plan. Thereafter, the KM 10 shares the application key of the PSK between the KMs 10 based on the key distribution plan and accumulates the application key.

Finally, an example of hardware configurations of the key management device (KM) 10 and the KAP 20 according to the present embodiment will be described.

Example of Hardware Configuration

Figure 13:
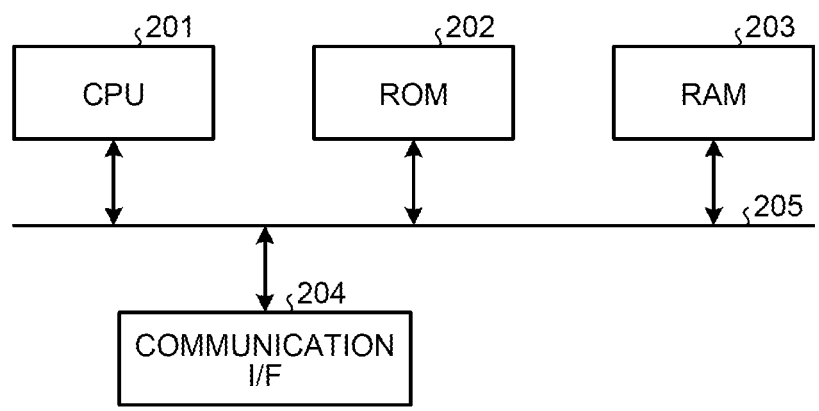
FIG. 13 is a diagram illustrating an example of hardware configurations of the KM and the KAP according to the embodiment.

FIG. 13 is a diagram illustrating an example of the hardware configurations of the KM 10 and the KAP 20 according to the embodiment. The KM 10 and the KAP 20 according to the embodiment include a control device such as a central processing unit (CPU) 201, a storage device such as a read only memory (ROM) 202 and a random access memory (RAM) 203, and a communication I/F 204 that is connected to a network and performs communication. The CPU 201, the ROM 202, the RAM 203, and the network are connected by a bus 205.

For example, a program executed by the KM 10 and the KAP 20 of the present embodiment is provided by being incorporated in the ROM or the like in advance.

For example, the program executed by the KM 10 and the KAP 20 according to the present embodiment may be configured to be provided as a computer program product by being recorded in a computer-readable recording medium such as a compact disk read only memory (CD-ROM), a flexible disk (FD), a compact disk recordable (CD-R), and a digital versatile disk (DVD) in a file in an installable format or an executable format.

In addition, the program executed by the KM 10 and the KAP 20 according to the present embodiment may be configured to be stored in a computer connected to a network such as the Internet and to be provided by being downloaded via the network. The program executed by the KM 10 and the KAP 20 according to the present embodiment may be configured to be provided or distributed via a network such as the Internet.

The program executed by the KM 10 and the KAP 20 according to the present embodiment can cause a computer to function as each unit of the KM 10 and the KAP 20 described above. In this computer, the CPU can read a program from a computer-readable storage medium onto a main storage device and execute the program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A key management device managing an application key used for encrypting communication of a user network including a plurality of cryptographic applications, the key management device comprising:
one or more hardware processors configured to function as:
a plan acquisition unit configured to acquire a key distribution plan formulated based on state information indicating a state of the user network;
a plan execution unit configured to determine a distribution amount of the application key for each key sharing destination corresponding to a destination cryptographic application based on the key distribution plan;
a communication unit configured to encrypt the application key using a link key generated by quantum key distribution (QKD) and to transmit the encrypted application key to the key sharing destination; and
a provision unit configured to provide the application key in response to a request from the cryptographic application,
wherein
the plan execution unit sets the distribution amount, sets a first value smaller than the distribution amount, and sets a second value smaller than the first value,
the communication unit stops processing of transmitting the application key to the key sharing destination when an accumulation amount of the application key is larger than the distribution amount, and starts processing of transmitting the application key to the key sharing destination when the accumulation amount of the application key is smaller than the first value, and
the provision unit stops processing of providing the application key when the accumulation amount of the application key is smaller than the second value.

2. The key management device according to claim 1, wherein the one or more hardware processors are further configured to function as:
an information acquisition unit configured to acquire the state information from a communication device included in the user network; and
a plan formulation unit configured to formulate the key distribution plan based on the state information.

3. The key management device according to claim 2, wherein
the state information includes at least one of a number of terminals connected to the user network, a communication speed in the user network, a communication amount within a certain period of time in the user network, and identification information for identifying a terminal whose communication frequency is greater than a-threshold predetermined value, and
the plan formulation unit predicts a consumption amount of the application key based on at least one of the number of terminals, the communication speed, the communication amount, and the identification information, and formulates the key distribution plan according to the consumption amount of the application key.

4. The key management device according to claim 3, wherein
the user network is a cellular communication network, and
the terminal is a mobile terminal connected to the cellular communication network.

5. The key management device according to claim 2, wherein
the state information includes at least one of a change in a number of terminals connected to the user network, a change in a communication speed in the user network, a change in a communication amount within a certain period of time in the user network, and identification information for identifying a terminal whose communication frequency is greater than predetermined value, and
the plan formulation unit predicts a consumption amount of the application key based on at least one of the change in the number of terminals, the change in the communication speed, the change in the communication amount, and the identification information, and formulates the key distribution plan according to the consumption amount of the application key.

6. The key management device according to claim 1, wherein the one or more hardware processors are further configured to function as a key processing unit configured to determine a provision amount of the application key, a provision time for providing the application key to the cryptographic application, and a destination indicating a provision destination of the application key in response to a request from the cryptographic application, and
the provision unit provides the application key of the provision amount to a destination indicating the provision destination by the provision time.

7. A quantum cryptography communication system, comprising:
a plurality of key management devices, wherein
the plurality of key management devices is configured to manage an application key used for encrypting communication of a user network including a plurality of cryptographic applications, and
the plurality of key management devices comprising:
one or more hardware processors configured to function as:
a plan acquisition unit configured to acquire a key distribution plan formulated based on state information indicating a state of the user network,
a plan execution unit configured to determine a distribution amount of the application key for each key sharing destination corresponding to a destination cryptographic application based on the key distribution plan,
a communication unit configured to encrypt the application key using a link key generated by quantum key distribution (QKD) and to transmit the encrypted application key to the key sharing destination, and
a provision unit configured to provide the application key in response to a request from the cryptographic application,
wherein
the plan execution unit sets the distribution amount, sets a first value smaller than the distribution amount, and sets a second value smaller than the first value, the communication unit stops processing of transmitting the application key to the key sharing destination when an accumulation amount of the application key is larger than the distribution amount, and starts processing of transmitting the application key to the key sharing destination when the accumulation amount of the application key is smaller than the first value, and the provision unit stops processing of providing the application key when the accumulation amount of the application key is smaller than the second value.

8. A quantum cryptography communication system comprising:
a quantum key distribution (QKD) network including a plurality of key management devices and a plurality of QKD modules, each QKD module being connected to each key management device; and
a user network including a plurality of cryptographic applications, wherein
the plurality of key management devices manage an application key used for encrypting communication of the user network, and
the plurality of key management devices comprising:
one or more hardware processors configured to function as:
a plan acquisition unit configured to acquire a key distribution plan formulated based on state information indicating a state of the user network,
a plan execution unit configured to determine a distribution amount of the application key for each key sharing destination corresponding to a destination cryptographic application based on the key distribution plan,
a communication unit configured to encrypt the application key using a link key generated by quantum key distribution (QKD) and to transmit the encrypted application key to the key sharing destination, and
a provision unit configured to provide the application key in response to a request from the cryptographic application,
wherein
the plan execution unit sets the distribution amount, sets a first value smaller than the distribution amount, and sets a second value smaller than the first value,
the communication unit stops processing of transmitting the application key to the key sharing destination when an accumulation amount of the application key is larger than the distribution amount, and starts processing of transmitting the application key to the key sharing destination when the accumulation amount of the application key is smaller than the first value, and
the provision unit stops processing of providing the application key when the accumulation amount of the application key is smaller than the second value.

9. A computer program product comprising a non-transitory computer-readable medium including programmed instructions stored therein, the instructions causing a computer for managing an application key used for encrypting communication of a user network including a plurality of cryptographic applications, to function as:

a plan acquisition unit configured to acquire a key distribution plan formulated based on state information indicating a state of the user network;
a plan execution unit configured to determine a distribution amount of the application key for each key sharing destination corresponding to a destination cryptographic application based on the key distribution plan;
a communication unit configured to encrypt the application key using a link key generated by quantum key distribution (QKD) and to transmit the encrypted application key to the key sharing destination; and
a provision unit configured to provide the application key in response to a request from the cryptographic application,
wherein
the plan execution unit sets the distribution amount, sets a first value smaller than the distribution amount, and sets a second value smaller than the first value,
the communication unit stops processing of transmitting the application key to the key sharing destination when an accumulation amount of the application key is larger than the distribution amount, and starts processing of transmitting the application key to the key sharing destination when the accumulation amount of the application key is smaller than the first value, and
the provision unit stops processing of providing the application key when the accumulation amount of the application key is smaller than the second value.

10. A key management method implemented by a key management device managing an application key used for encrypting communication of a user network including a plurality of cryptographic applications, the method comprising:
acquiring a key distribution plan formulated based on state information indicating a state of the user network;
determining a distribution amount of the application key for each key sharing destination corresponding to a destination cryptographic application based on the key distribution plan;
encrypting the application key using a link key generated by quantum key distribution (QKD) and transmitting the encrypted application key to the key sharing destination; and
providing the application key in response to a request from the cryptographic application, wherein
the method further comprises:
in the determining of the distribution amount of the application key, setting the distribution amount, setting a first value smaller than the distribution amount, and setting a second value smaller than the first value,
in the transmitting of the application key, stopping processing of transmitting the application key to the key sharing destination when an accumulation amount of the application key is larger than the distribution amount, and starting processing of transmitting the application key to the key sharing destination when the accumulation amount of the application key is smaller than the first value, and
in the providing of the application key, stopping processing of providing the application key when the accumulation amount of the application key is smaller than the second value.

* * * * *